United States Patent
Alexander

(10) Patent No.: US 8,667,025 B2
(45) Date of Patent: Mar. 4, 2014

(54) VARIABLE SUBSTITUTION DATA PROCESSING METHOD

(76) Inventor: Jackson-Smith Alexander, Buchbach (DE)

( * ) Notice: Subject to any disclaimer, the term of this patent is extended or adjusted under 35 U.S.C. 154(b) by 0 days.

(21) Appl. No.: 13/510,203

(22) PCT Filed: Nov. 9, 2010

(86) PCT No.: PCT/EP2010/067116
§ 371 (c)(1),
(2), (4) Date: May 16, 2012

(87) PCT Pub. No.: WO2011/058011
PCT Pub. Date: May 19, 2011

(65) Prior Publication Data
US 2012/0278345 A1 Nov. 1, 2012

(30) Foreign Application Priority Data
Nov. 16, 2009 (GB) .................................. 0920055.1

(51) Int. Cl.
*G06F 17/30* (2006.01)
(52) U.S. Cl.
USPC .......................................... 707/793; 713/150
(58) Field of Classification Search
USPC .................... 707/793, 781; 713/193
See application file for complete search history.

(56) References Cited

U.S. PATENT DOCUMENTS

| 2004/0162964 A1* | 8/2004 | Ota et al. ................. 712/200 |
| 2004/0174570 A1* | 9/2004 | Plunkett et al. ............... 358/3.13 |
| 2004/0186967 A1* | 9/2004 | Anand ........................ 711/156 |
| 2010/0161696 A1* | 6/2010 | Matsui ....................... 708/209 |

FOREIGN PATENT DOCUMENTS

| CN | 101546320 A | 9/2009 |
| EP | 1 059 760 A1 | 12/2000 |
| JP | 10322317 A | 12/1998 |
| JP | 2006108994 A | 4/2006 |

OTHER PUBLICATIONS

GB Search Report for Application GB0920055.1, dated Mar. 9, 2010.
J. Daemen, AES Proposal: Rijndael, AES Proposal, The Rijndael Block Cipher, Sep. 3, 1999, pp. 1-45, v.2.
T, Messerges, Securing the AES Finalists Against Power Analysis Attacks, Fast Software Encryption, International Workshop, vol. 1978, Apr. 1, 2000, pp. 150-164.
International Search Report dated May 1, 2011, issued in International Application No. PCT/EP2010/067116 (7 pages).

* cited by examiner

*Primary Examiner* — Thu-Nguyet Le
(74) *Attorney, Agent, or Firm* — Beem Patent Law Firm

(57) ABSTRACT

In an embodiment the present invention relates to a method comprising: inputting data in binary form; arranging the input data in segments; determining a plurality of values based on respective ones of said segments; using said values to determine locations where a predetermined transformation is to be applied to a sequence of bits; performing said predetermined transformation on said sequence of bits at each of said locations; outputting the sequence of bits as first output data. The present invention can be applied to encryption and decryption of data, data comparison and verification, and random data generation.

23 Claims, 19 Drawing Sheets

VARIABLE SUBSTITUTION DATA PROCESSING METHOD

This is a 35 U.S.C. §371 application of Application PCT/EP2010/067116, filed Nov. 9, 2010, which claims priority to British Application GB 0920055.1, filed Nov. 16, 2009.

FIELD OF INVENTION

The present invention relates to a method of processing data, and particularly to a method of structuring data, in which the context is definable in order to be suitable for tasks across a wide spectrum. The present invention relates to a single method of structuring data and provides such implicit support as to facilitate a fully definable context control. Through definable context control: effective encryption, fast data comparisons or creation of randomised data are achieved.

BACKGROUND RELEVANT TO THE INVENTION

Introduction

Since the beginning of the digital age, more efficient and safer storage of digital information has been strived for. Computer memory has standardised upon data structures being stored in memory and defined using fixed size. Encryption has concentrated upon mathematical complexity in block based ciphers.

The Field of Data Management

Creating, structuring, controlling and managing data across all disciplines is not recognised as a single area of professionalism today. Professionals tend to be categorized by the specific solution area or discipline in which they operate and not truly in the field in which they operate. Areas of skill are shrinking in their scope. The more skills required for a person to be considered a skilled or professional person in a field, the more they need to learn before they are productive. As skills and knowledge grow the requirement for ever more specialization is based upon the quantity of skills combined with the average person's ability to learn it. This invention challenges this narrowing, in that the invention covers a technology that brings many fields together back into a single field of data structure and management.

Memory Structure

Storage together with the processes of checking and manipulating digital information in the memory of a computer is a grouped binary based logic; grouping into blocks of 7, 8, 16, 32 or 64 bits etc., in the most common systems today. This method of storing and visualizing digital information not only affects the efficiency of some processing operations but also has forced the current standard approach for software developers and system analysts, and as a consequence establishes the typical way by which programming development tools work to resolve many of the technical computing requirements of today.

The memory in a computer is currently based upon a binary data definition and is 2 dimensional in structure and definition. A "1" located in the bit position represents a value based upon the binary column position. In binary a "1" in the first column is 2 to the power of 0; in the second it is 2 to the power of 1; in the third it is 2 to the power of 2 and so on. Therefore within a byte of 8 bits a total value range between 0 and 255 can be represented. This is the most efficient usage of the space possible.

Current Compromise

Electronic computers, as with other embedded systems, establish and define the method of structure, form and subsequent operational use and efficiency of digital information. The structure is implemented similarly in all computers and has served us well. However, as with many technical implementations compromises are often needed to create a solution. Computers and computing devices have this fixed approach and by consequence, have compromises in some areas where information is used, stored or processed. The future, and the substance of this invention, is to deliver an alternate method of storing and manipulating information that brings performance benefits and functional benefits in the situations where the current methods are a compromise.

New Demands on Encryption

Furthermore, the need for encryption and keeping secrets, while being established way back in the past, only really exploded commercially relatively recently. Prior to commercial microchip manufacture that enabled the world of computing to exist for average people and average businesses: wars, conflict and the military had always driven the need for safe encryption systems. Ironically, however, the very availability of this computing and the subsequent success in the "Performance Race" actually made each existing and valuable solution in the history of recent cryptography, shine only for a limited time until computer processing performance caught up and forced systems to go into retirement. The quantity of digital information that people and companies store and manipulate has grown exponentially over the last decade. The internet, music (mp3), digital video encoding and DVD's have all done their bit to contribute to this growth. The Internet not only enables communication, but also provides access to the largest library of information ever available to man and that within only a few years of it coming into existence. Music, Video and other forms of media have been seen as a cost saving opportunity for publishers and distributors but have equally put these businesses at risk. As this increase in demand has grown and made the production of memory and disks cheap, so have the new requirements grown. Ideas that were unthinkable a few years ago are not only possible but are being done. The mapping of DNA and other large storage hungry applications have become possible, at least with regard to storage. Yet the structure for storage and method for manipulating digital information has been treated inherently, as set in stone. Few have created new storage philosophies to aid processing methods, save perhaps the area of compression for space saving.

Historical Encryption

The development of encryption for commercial purposes has meant that various systems have been established as de facto standards.

DES (Data Encryption Standard) was developed in the mid 1970s; used mainly for commercial application; and broken by cryptanalyst's within 25 years. The message was encrypted block by block, so the process is described as a block cipher. Originally the encryption/decryption key was 56 bits long, but this was increased after a successful attack by cryptanalysts. An enhanced system described as Triple DES was used with longer keys. The American National Institute for Science and Technology invited the submission of new algorithms to replace the vulnerable DES. In 2001 the AES (Advanced Encryption System) was introduced. It was a block cipher process and used much longer keys than DES. However computer power is increasing rapidly, and much money is being invested in the development of quantum computers. If they are successful they will dramatically increase the power available to cryptanalysts for exhaustive key searches.

Where asymmetric (public key) encryption is used, keys are mostly much larger, and cryptanalysts attempt to attack the underlying mathematical formula. RSA for example is an important public key encryption method. This is also vulnerable to attack and there are attempts to increase the complexity of the algorithm and lengthen the key.

Stream ciphers encrypt the message letter by letter or bit by bit. One of the strengths of stream ciphers is that they lack error propagation. An erroneous encryption of one bit does not affect subsequent bits. The weakness is that if the plain text is discovered and the corresponding cipher text is known then the key stream sequences may be deduced. It is difficult to manage the distribution of the key stream and indeed to generate it in the first place from shorter seed keys. Stream ciphers are appropriate for data sent as continuous stream and used by the recipient as a stream, e.g. films and music. Block ciphers on the other hand offer a higher level of security and are typically used in financial transactions. In such usage organising data into blocks does not present a problem.

Statistical Testing

Statistical testing forms a fundamental component of the assessment of block ciphers. If an attacker is conducting an exhaustive key search, then there should be no indication that they are near to the correct key. Several methods have been introduced to strengthen block ciphers. There are two standard ways known as cipher feedback mode and cipher block chaining mode. This is another way in which cryptographers make their algorithm more complex in order to protect against more powerful cryptanalysis.

Current Encryption

The one-time pad is a stream cipher with a key stream that is random. This is generally taken to be the only way to achieve perfect secrecy. However there is a practical problem associated in distributing the key and therefore it is deemed to be impracticable. Commercial encryption is relatively new and is most often implemented using block ciphers with mathematically induced disruption. The leading authors and encryption organisations define the following functional requirements for modern cryptographic systems: integrity, the protection against messages being changed; non-repudiation, the ability to prove that the sender sent the message; authentication, to prove that the sender is who he purports to be.

Processing Data Efficiently

Storing, using and manipulating digital information today does not in itself have a problem. It does work. However as larger memory and storage hungry systems place ever-greater demands upon processing performance and energy requirements the enthusiasm to move into new areas is more often dampened because the physical hardware technology is not yet sufficiently mature or capable. In some cases the foundation thinking behind computing is that a job is done or not done, and the answers to questions are exact. This does not actually reflect much of the real world. While the tax office would not take kindly to an invoice approximating the amount due for sales tax, industries that use approximations and statistics can indeed accept a compromise, clearly within tolerances, that are both useful and where needed lawful. A current computer being applied to the problem of determining a difference between say two large strands of DNA would with traditional thinking need to process each segment or block and compare it with its relative equivalent in the other being compared against. Of course upon the detection of a difference the looping process can stop and the processing energy, time and performance need not be wasted continuing the check, however a change can occur anywhere and therefore the entire check could theoretically be performed. The principles of organising and storing digital information to allow a processor to be more efficient in performing certain operations is per se probably not new but the system this patent covers certainly is.

Current Inconsistencies in Thinking

Since cryptography has been of interest commercially, there has been a very clear tendency to follow one specific path of thinking with a pair of overlapping but closely allied philosophies. Cryptographic techniques can be broken into two basic camps: "Stream" based systems and "Block" based systems. "Stream" based systems are fast in the opinion of leading edge development in this area, but fail to provide as safe an encryption basis as the modern world requires today. "Block" ciphers are slower but are deemed to be safer. Cryptography also makes a fundamental distinction between the manner in which a cryptographic system goes about "hiding" or "disturbing" the message, namely: true random based disturbance or mathematical induced complexity based disturbance. Currently the only commonly accepted absolute safe system in existence is the One-Time-Pad (OTP) or Vernam Cipher under the condition that a key is only used once and is random. This OTP system is a "Stream" based system using true random as its source for disturbance. All current modern systems being employed today are "Block" based encryption with mathematically induced complexity based disturbance. This fundamental difference of what has been proven to work being one hundred and eighty degrees out of synchronisation with the drive of current professional thinking raises more questions than it answers. However the importance of this change in direction is directly relevant to the system in this patent and to the characteristics that are simply not achieved with current approaches and implementations of encryption systems. For the purpose of completeness it is worth pointing out that the OTP system is unrealistic for most implementations because of practical limitations and not limitations in its ability to provide absolute security.

Random Data and Use

Mathematicians and engineers use random data for statistics and testing. A data stream is defined as random if it is unpredictable. While this definition is commonly accepted, it is not easy to derive a test to confirm that data is random. One way is to see if the data can be compressed, since true random would offer no patterns or repetition to allow it to be represented in a shorter form. Random sources of information are needed for statistics and other related mathematical tasks. Mathematicians define random as being information that is unpredictable. While it is a definition that is perfect it does not imply an easy or achievable method of turning out a resulting tool to test. For this purpose the world of compression is an excellent method of testing randomization. Compression aims to identify patterns in data and use patterns to represent the data in a shorter form. Ultimately random information can be deemed so if a person, tool or other mechanism cannot determine a pattern and neither can they predict the information that comes next.

Encryption Conclusion

In summary, cryptology is more important now than ever it was. The Internet offers an opportunity for those determined to discover information needed to be kept secret. Solutions to date are mere palliatives. Encryption techniques based on current thinking lean towards greater complexity and key size. One weakness which has yet to be addressed in the design of current encryption systems is that no single part of a system should contain unnecessary information. Such unnecessary information would give someone the ability to derive knowledge that they should not have. The solution to this is to either follow the trend of increasing complexity, or to devise a system which does not depend on complex mathematics. Such a system should ideally make it impossible to succeed with an exhaustive key search whilst additionally rendering it impossible to yield the message from the cipher text without the key, thus making the system totally secure. Furthermore, commercial encryption is relatively new and is most often implemented in the form of a "Block Cipher" with a mathematical induced disruption. The leading authors and encryption organizations set in stone the following additional functional requirements for modern cryptographic systems: Integrity, the protection against messages being changed; Non-repudiation, the ability to prove the sender sent the message; and Authentication, to prove that someone else has not pretended to be the sender. We believe these additional functional requirements are not only unnecessary but also dangerous. We base this on the knowledge that a One-Time-Pad has none and is absolutely safe.

The present application also includes consideration of a characteristic that is not mentioned in the leading publications of today namely: Authorization, the ability to derive knowledge of only such parts of the system as are necessary for a system to work. This additional functional requirement is fundamental to such systems as Digital Rights Management (DRM), because the aim of DRM is to attempt to provide a decrypt key to the purchaser at the same time as not allowing the purchaser to know the key. This currently appears impossible and in the absence of Authorization, it is impossible. Therefore, DRM currently concentrates upon complicated and manufacturers' trust based systems in addition to embedding lock keys in playback machines. However, the future must be to create encryption that does not rely upon mathematical description nor is it able to be mapped, and thereby disabling all computers, current and future, as a tool for "cracking" encryption.

DEFINITIONS

In this patent application it is necessary to introduce several new terms that are similar, but have important differences, to current thinking or practice in the fields relating to the embodiments.

Baseline

The "Baseline" is a source of data that is used to provide the reference value for any transform to take place. Depending upon the embodiment the "Baseline" can be viewed as similar to certain existing concepts.

In the embodiments that are an encryption solution the "Baseline" can be equivalent to the "Key" in traditional encryption systems: the "Baseline" becomes the shared secret between two parties allowing an encryption or decryption to be performed.

In embodiments where the transformation increased performance for comparison or searching, the "Baseline" is similar to the initialization of a data field prior to use: a field needs to have "0" or "spaces" applied to it or have a hex"00" value applied. Subsequent data is added to this initial value to represent the data.

In embodiments where the transformation is being used to create random data the "Baseline" can be seen as either a random source: the creation of random needs a "seed" or "seed key" for the creation to be different on each occasion, this process is performed with one or more iterations.

Block Size

The "Block Size" is the term used to describe the size in bits by which the input data source(s) are brought into the transformation: the "Block Size" additionally defines the minimum number of values that are needed to represent each possible permutation.

Block Values

The "Block Values" is the term used to describe the actual combination of bits for a block of given input data: the value of a portion of input data is the "Block Value".

SUMMARY OF THE INVENTION

Introduction

The present invention needs to be seen in the context of all computer memory used today. The method data is stored and manipulated in memory is currently broken into bytes. A byte, according to the entries in Wikipedia, is a grouping of bits which become the smallest addressable data block for a computer processor instruction to read from or write to.

The invention is a data transformation into a form that is different to current byte organised memory. This new form creates an environment for three main embodiments. Firstly a transformation of data into a structure that provides encryption. Second a transformation of data into a structure that provides fast data comparisons in a computing environment. Third it is a transformation of data into a structure that is randomised. The transformation can still be applied and then stored in traditional existing data storage: existing systems using bytes and byte based data storage can still be used to record the data. Data storage in this instance includes disks, cd's, DVD's, computer memory etc.

Memory Structure

The main difference being that the bytes and the boundaries between have no meaning or constructive purpose: the data does not use the same size for different characters as per the current thinking. The present invention essentially transforms data and stores said information as joined lengths of value. In comparison to current memory, the position of memory storing information transformed according to the present invention does not represent a multiple of the previous bit: with transformed data a "1" in a specific position in memory does not give the data a value. The value is derived from the previous information and the relative position to the previous information. The present invention works to define data in memory without any optimization of space usage, but rather uses a bit value as a marker for the information, which is structured as lengths. This so-called length represents the value and not the "1" and "0" combinations and positions in the data. Transforming data to this form provides different characteristics that enhance computing and are complementary to, and not necessarily a one to one replacement for the current single existing method of data structure and storage. This transformation process provides a strong foundation for an encryption ready data structure, efficient data comparison structure and a powerful form for random data creation.

First Embodiment

The first embodiment refers to the present invention in that the transformation of data using this invention enables effective, fast and powerful encryption. Data will be input in any computer-processable from. Whatever the form it will have one or more segments, most typically (groups of) bits. The segmentation and/or the segment size may be (re-)defined to suit the application. The following description and examples use binary for illustration as this is the most common form used in computers today.

The invention achieves effective, fast and powerful encryption by the following means:

In user perspective the "Baseline" is used as a private key; the plaintext is a "data source" and the "output" is the cipher text (See Figures). Optionally the use of the enhancements to enable inclusion of a second or subsequent "data source" in the form of random combined with the decision to switch between the "data sources" using random, and the ability to change the "Block Size" and "Block Values" using random provides a complete and irreversible basis of encryption of information (See Figures).

It will be clear to a professional in the field of encryption that an inverse transformation must be possible to recover the message given only that the possession of the key and initial states and usage pattern of the encryption transformation are known to that party (See Figures).

Second Embodiment

The second embodiment refers to the present invention in that the transformation of data using this invention enables a preparation of data to enhance the performance for processing logical data operations and comparisons in a digital processing environment. The invention achieves this by the following means:

The data record(s) or field(s) is applied as "data source(s)" and the "output" is used to compare or perform data operations upon (See Figures). Optionally the ability to set a secret value for the "Baseline" allows this processing of data to be performed upon data that is encrypted, without this data requiring decryption prior to said processing. Optionally the use of the enhancements to enable inclusion of a second or subsequent "data source" enables the secrecy to be maintained without the ability to compare or perform probability checks being undermined (See Figures). Additionally the professional in the field will recognise that if the transformation need not be reversed, the need to store the transformed data is not necessary, but for performance and space saving the length of a given transformation, in numerical form, is stored in place of the original data. A transformation need not be reversed when a field is stored for searching, indexing, verifying or identifying. In these instances a reversal of the actual data is often not needed.

Third Embodiment

The third embodiment refers to the present invention in that the transformation of data using this invention enables a complete randomization of inputted data. The invention achieves this by the following means:

A source of information is passed into the transform as one or more "Input source(s)", another source of information is passed into the transform as "Baseline" and the resulting "Output" is an irreversible combination of the given inputs (See Figures). Optionally other sources of information can be used to control or provide adaptation and deviation to the other features (See Figures).

BRIEF DESCRIPTION OF DRAWINGS

Exemplary embodiments of the invention will be described by reference to the accompanying drawings in which.

DETAILED DESCRIPTION OF EMBODIMENTS OF THE INVENTION

A—Core Transformation

Figure 1:
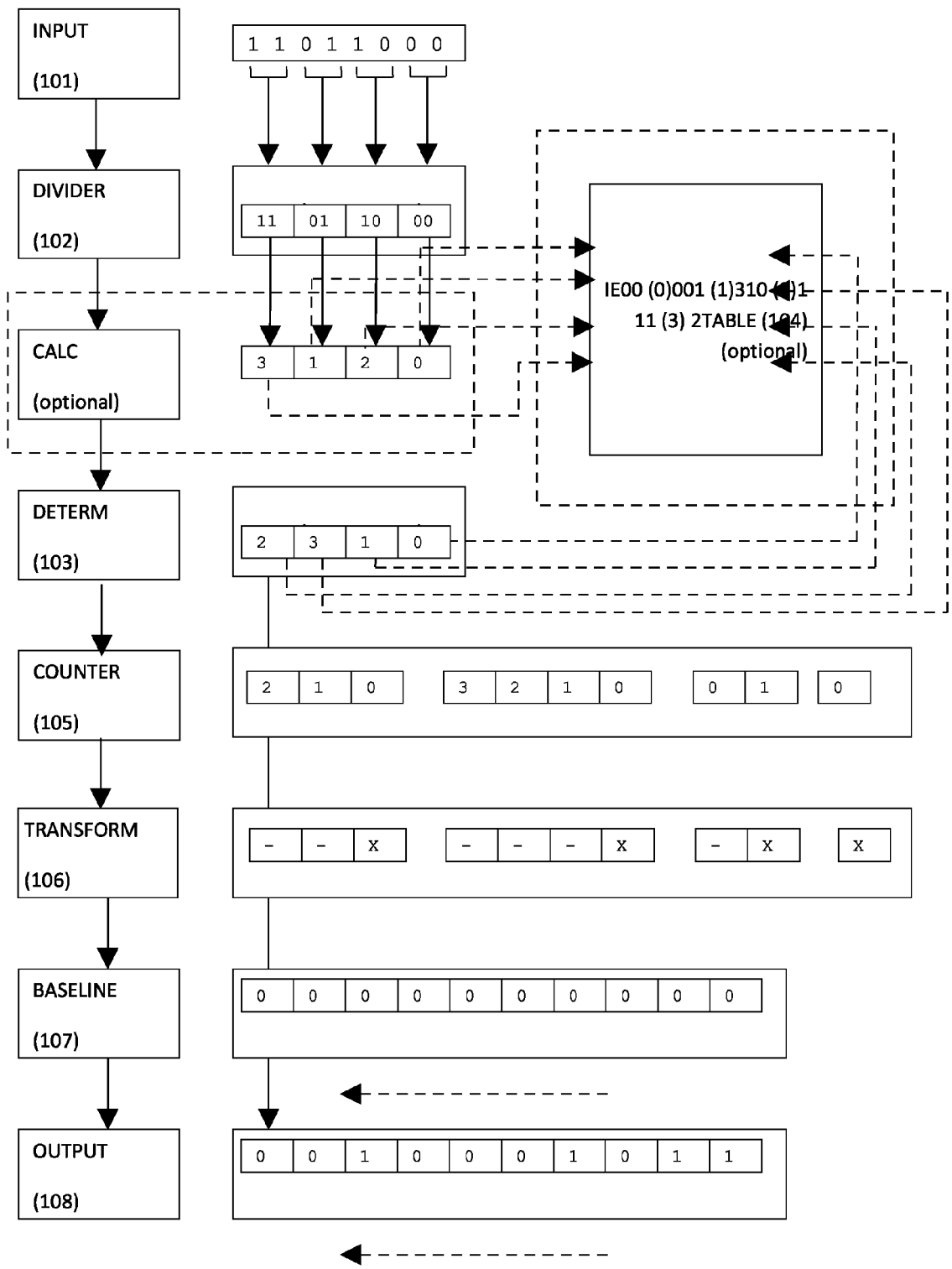
FIG. 1 illustrates a method according to an embodiment of the invention.

The core version of the transformation converts data from the currently standard; currently implemented or expected bit/byte memory structure to a structure with attributes of benefit and functionality. Such benefit and functionality would not normally be associated or derived from a type of memory or data structure.

The transformation involves taking two input sources to create an output. Of the two input sources at least one is an input source of data ("input data") that is to be transformed; at least one is a source of data to provide a reference value, ("baseline"), on which the transformation process causes controlled and localised modification. Said modifications are based upon the "data source" or "data sources" and optionally in this and later enhancements through other options, settings and configurations. The output ("output") is the result of the transformation.

The core transformation sets a size ("block size") by which each "data source" will be broken into segments ("segments")

for processing. The core transformation works on the basis this "block size" is set once at the beginning, later enhancements include variable possibilities.

The "input data" is read into the transformation process sequentially in "segments" based upon the size specified as the "block size". The value of the current "segment" represents a number ("block value"). The "block value" is unique to each permutation and always greater than or equal to one.

The "Baseline" is a continuous source of data of sufficient length for the length that the transformation will produce in the "Output": the "baseline" is used in a sequential form reading and processing each bit as required.

The number represented by the current "block value" is used to determine the number of next sequentially unused bit(s) in the "baseline" that taken are passed to and appended to the output; alternating between each processed "segment" each group of bits from the "baseline" for taken for each segment are either passed and appended unchanged or are passed and appended having operated the logical NOT operation on said bit(s).

This process occurs repeatedly until the "input data" has been fully processed.

Common Principles in the Invention.

Many of the additional enhancements make use of similar techniques to provide support or enhancements to the core transform. The following are definitions that are used throughout the additional enhancements and are designed to simplify and remove the repeats.

"NEW VALUE"—in implementing enhancements it is necessary to establish a mechanism for denoting the change in configuration. Such changes need to establish a data value that is unique. The actual value chosen depends upon the actual implementation or settings however, the value may only be used once in the definition or configuration.

"IMPLICIT SUPPORT"—in implementing enhancements it is possible to make processes or decisions, defined in the embedded instructions, in such a form that the steps are performed by consequence rather than a specific instruction or instructions as per the examples provided in this document. Such implicit support, be it normal practice to program in such a manner or not, is substantially the same and is perceived as a method of implementing the invention using an alternate method to achieve the same results in practice.

"LOGICAL NOT"—in this invention the logical NOT operation is used to describe a fundamental principle of the transformation. The application of the "Data source(s)" upon the "Baseline" uses the reference "Logical NOT" to perform the function of differentiation of the state of a given bit or bits from the "Baseline" such that the differentiation allows the reversal of the process. Reversal is enabled in this way in that a comparison of the "Baseline" with the "Output" provides a set of numbers that through the implicit settings or the "Lookup" can be transformed to the currently understood and used data structure.

B—Transformation Enhancement—Separate Markers

Enhancing the transformation to support separate markers ("markers") in that the marking or demarcation between the transformed segments is achieved through an additional separate bit obtained from the "baseline" and that the alternating between no change and logical NOT operations is retained only in that either the separate "marker" or the transformed "input value" performs the logical NOT operation on the "baseline" bit(s), the other passing bit(s) are derived from its process unchanged.

This is done where each "segment" is used to obtain the correct number of sequential bits from the "baseline", however the "baseline" bits appended to the "output", in this example do not have the logical NOT operation applied to them prior to passing and appending them to the "output" and after which an additional sequentially obtained bit is taken from the "baseline", has the logical NOT operation applied to it and is then passed and appended to the "output". In this enhancement the "block value" must still be unique to each permutation but will allow the value zero.

This process occurs repeatedly until the input source has been fully processed.

In summary, the core transformation together with this enhancement, is the total sum of the "block value(s)", together with the bits in between as markers sets the number of bits that are required from the chosen "baseline"; the required "baseline" bits are copied to the "output" and the NOT operations are applied to the bits in-between the unchanged bits specified by the "block value(s)".

C—Transformation Enhancement—Alternating Input Values

Enhancing the transformation to support using the alternating of input values is achieved in that the core transformation represents the transformation whereby the markers are a separate value being applied to the baseline prior to being added to the "output". In this enhancement the "input values" are assigned a replacement value that is applied alternately either as an amount of bits of the "baseline" with no change applied to each of the bits and subsequently being added to the "output" or alternately as an amount of bits of the "baseline" whereby the NOT operation applied to each of the bits and subsequently added to the "output".

D—Transformation Enhancement—Multiple Input Sources

Enhancing the transformation to support multiple input sources ("Inputs sources") is achieved in that a "block value" that is impossible ("file change value") given the selected or current "block size" is used with the "Baseline" to denote the "data source" change.

A change between two or more inputs can be prearranged or randomly initiated. In the case that the changes are prearranged there is no need to denote the change in input source during the transformation; if the choice to change from one source to another is random or known only to one party then this change must be denoted in the "output" of the transformation.

When a file change takes place the "file change value" is used to represent the change in which "data source" is current and the "file change value" determines the number of next sequentially unused bit(s) in the "baseline" that are passed to the output without change; the next unused bit from the "baseline" has the NOT operation applied and this too is added to the "Output".

E—Transformation Enhancement—Setting Alternate Values to Represent Block Values

The core transformation works based upon a "block value" being the same as the actual value for the given block.

Enhancing the transformation to support alternate values is achieved in that a "block value" is assigned an alternate value from that which it numerically represents.

The assigning of an alternate value ("equivalent value") to the "block value" can be accomplished in varying standard programming and logic techniques used today; for the purposes of illustration and example a simple lookup table approach has been used.

When in the core transformation a "block value" is being used for passing the next free bit(s) from the "baseline" to the "output" the "block value" is replaced with another value to be used for the said selection of bit(s) from the "baseline"; passing of said bit(s) to the "output" and subsequent changes with the NOT operation remain unchanged.

F—Transformation Enhancement—Dynamically Setting Alternate Values to Represent Block Values Enhancing the transformation to support dynamic values goes one step further from alternate values; in this enhancement the ability to reassign ("value reassignment") the "equivalent value" to a different "block value" during and in line of the process of a transformation.

The assigning of an "equivalent value" for illustration and example has been done in a lookup table; if this lookup table has sufficient variations of association between each possible "block value" and one or more "equivalent value" for each "block value" and that to each combination a new unique value in the lookup table can be used to denote which combinations is current, upon said reassigning the identifying value ("reassigning value") can be applied to the "output" to denote this change.

When a "value reassignment" takes place the "reassigning value" is used to represent the change and determines the number/quantity of next unused bit(s) in the "baseline" that are passed to the output without change; the next unused bit from the "baseline" has the NOT operation applied and this too is added to the "Output".

Such "reassigning value" may denote the next or previous value reassignment permutation, relative to that currently used, rather than an explicit "value reassignment".

G—Transformation Enhancement—Setting Alternate Block Sizes

Enhancing the transformation to support alternate block sizes is achieved in that the "Block size" can be any integer size from one through infinity. Such change can be made either implicitly in the implementation of the invention or can be set in a configurable location and obtained at the beginning of the transformation. It is important to note that it is not unreasonable to take advantage of using differing "block sizes" for each "data source".

H—Transformation Enhancement—Dynamically Setting Alternate Block Sizes

Enhancing the transformation to support dynamically changing block sizes is achieved in that the "Block size" can be changed during the process of a transformation. Such change can be made based upon a predefined sequence plan, dynamically or randomly. In such cases as predefined changes the recording or denoting of such change is possible but not necessary. In the case that the transformation is performed using dynamically or randomly initiated "block size" selection, to identify the current "block size" a form of identifier needs to be set if the transformation is to be reversed.

The identification of the current block size in use ("current block size value"), if required, is used to denote a change and must be an equivalent value that has not already been assigned to represent any other "input value" or "equivalent value".

When the "block size" change takes place the "current block size value" is used to represent the change and determines the number/quantity of next unused bit(s) in the "baseline" that are passed to the output without change; the next unused bit from the "baseline" has the NOT operation applied and this too is added to the "Output".

I—Transformation Enhancement—Setting Markers as Prefix or Suffix

Enhancing the transformation to support a choice of prefix or suffix for the "marker" is achieved by defining in the transformation either the "marker" processed on the next available bit from the "baseline" prior to processing the next "input value" or by defining that within the transformation an "input value" is processed and then followed by a "marker" processed on the next available bit from the "baseline".

The distinction between the two is small in that the entire transformation is shifted by one bit if the prefixing has been used, and fails to have a "marker" at the end of the valid sequence.

J—Transformation Enhancement—Dynamically Setting Markers as Prefix or Suffix Enhancing the transformation to support a choice of prefix or suffix for markers is achieved by selecting in the transformation if the "marker" operation is performed prior to the "block value" being used to determine the amount of "baseline" added to the output creates a prefix based transformation, or if the "marker" is applied after the "block value" has been used to determine the "baseline" added to the "output" creates a "suffix" based transformation.

The core transformation describes an implicit "suffix" based transformation in that the "marker" is applied as a NOT function after the current "input value" has been applied.

K—Transformation Enhancement—Setting not Operation for Markers or the Input Values Enhancing the transformation to support NOT operations being associated and used for either "markers" or for the processing of "input values" can be achieved in that the defining of each can be implicitly defined in the implementation or can be defined using a separate method of definition that is obtained at the beginning of a transformation.

L—Transformation Enhancement—Dynamically Setting not Operation for Markers or the Input Values Enhancing the transformation to support dynamically setting NOT operation for markers or the input values is achieved in that a logical NOT operation is associated with either the "markers" initiated "baseline" bit(s) having had the logical NOT operation performed prior to being appended to the "output" or the "input value" initiated "baseline" bit(s) had the logical NOT operation performed prior to being appended to the "output"; whereby one is chosen to perform the logical NOT operations and the other is appended unchanged.

This enhancement also requires an additional identification ("NOT marker") to be transformed upon the "baseline" if the transformation is to be reversed. If the transformation does not need to be reversed the "NOT marker" may however still be used.

M—Transformation Enhancement—Dynamically Setting not Operation Based on Segment Position Enhancing the transformation to support dynamically setting NOT operation based on segment position is achieved in that a logical NOT operation is associated with either the odd or the even segments as they are obtained for processing. Where the odd applies the Logical NOT the even segments do not and vice versa. Whichever combination is used both are subsequently appended to the "output" or the "input value" initiated "baseline" bit(s) had the logical NOT operation performed prior to being appended to the "output"; whereby one is chosen to perform the logical NOT operations and the other is appended unchanged.

This enhancement also requires an additional identification ("NOT marker") to be transformed upon the "baseline" if the transformation is to be reversed. If the transformation does not need to be reversed the "NOT marker" may however still be used.

N—Transformation Enhancement—Dynamically Setting not Operation Based on Input Value Enhancing the transformation to support dynamically using the "input value" to determine if the next bit is a "baseline" with no change or if the bit is a "baseline" bit having applied the NOT operation, after which either are added to the "output".

O—Transformation Enhancement—Nesting Multiple Transformations

Enhancing the transformation to support nesting multiple transforms is achieved by processing the "output" of a transformation and providing this as either an "data source", "baseline" or given several preceding transformations as both "input source(s)" and "baseline(s)".

Obviously this is based upon the level of required complexity; desired performance and purpose and skilled people in their fields will be best suited to tailor the combination of known methods and nesting presented here.

P—Transformation Enhancement—Padded End to Compensate for Fixed Byte Memory

Having processed an input source into the transformed data structure the resulting number of output bits (length) is not likely to be exactly an integer when divided by the given byte size. For example the transformation results in 10 bits this is 8+2, where it is 1 times 8 bit byte and 2 bits. This means that the last byte to be stored on an existing computer using 8 bit bytes needs extra bits to pad the end to make the last byte full.

This can be achieved in that the resulting bits can be passed unchanged from the baseline to the output stream without change. This can result in a partial byte when the transformation is reversed and such situations need to be calculated in the selected reverse transformation process.

Q—Transformation Enhancement—Simulated Values Ending to Protect Encryption Key Secrecy Similarly to the above (P), but in addition the problem exists where the encryption and key secrecy is important and the adding of unchanged baseline to the output source provide an undesired risk to secrecy.

In this instance a padding is still required however a change to a random source is denoted and additional bytes from a random source are transformed and added to the output stream.

R—Reversing a Transformation

The reversal of a transformation to return the data to the traditional data structure works on the basis of comparing the baseline with the data to be transformed. By determining the differences and recording the number of differences and non differences the appropriate entry in the lookup table is used to reconstruct the data.

Core Embodiment

Encryption

A transformation of data into a structure that provides an encryption embodiment can be achieved with the core transformation with or without one or more of the listed enhancements.

Differences and Similarities to Other Encryption Systems

1. Most common encryption systems that are used today work on a process of mathematics and complexity. A Vernam's Cipher with a Random Key is deemed by Encryption Professionals to be the only truly safe encryption system. It merges Random with the message and provides no checksum, authentication, non-repudiation nor integrity check or verification and as such therefore provides no confirmation that a message has been successfully found. This invention also allows the merging of random with the message, provides no checksum, authentication etc and also provides no mechanism to confirm that a message has been successfully found.

2. Output from this invention has a high tendency to produce equality in the data value distribution. This means that for a given output the proportion of 1's and 0's is close to 50:50; the proportion of 00, 01, 10, 11 is close to 25:25:25:25 and so on. This inherent balance in the output provides a level of meaningless when trying to interpret the output that for an encryption or random use is fundamental.

3. A "One-Time-Pad" based encryption system is deemed to be the only safe system, however this ability to use a key only once for security is based upon the simplicity of a Vernam's Cipher and the ability to reverse it and reveal the key. This invention when used for encryption allows the inclusion of one or more input sources with random. The inability to determine what key has been used is complemented by the inability for an eavesdropper to determine the contents or separation of the various input sources. This allows a transmission to provide either a change or a complete new key which exceeds the capabilities of a "One-Time-Pad" encryption implementation.

4. Existing encryption systems when given a key and a plaintext to encrypt will produce the same resulting output regardless of the number of times the encryption is performed. With this invention, encryption processes that make use of random initiated or random including enhancements will deliver an "output" that is different upon each new execution when compared to previous executions, even though the key, plaintext and invention are the same.

Core Embodiment

Data Processing

A transformation of data into a structure that provides fast data comparisons in a computing environment can be achieved with the core transformation with or without one or more of the listed enhancements.

Differences to Standard Data Structures in Processing

1. The standard data structures use the length of space to denote the amount of information that can be stored. This forces processing operations to examine the data to make use of any part of it, even though the actual operation may only require a "feel" for the data.

2. Existing data storage and manipulation makes no attempt to structure the fundamental format of bits and bytes to speed up. It concentrates on compatibility with existing computer memory designs and expectations. Data transformed with this invention makes no compromise on the data for the purposes of best use of space.

Core Embodiment

Random Data Creation

A transformation of data into a structure that is randomised can be achieved with the core transformation with or without one or more of the listed enhancements.

Differences to Other Random Creation Systems

1. Smaller sources of Random data can be used and transformed to create far more quantity of random than the original random data itself.

2. Even though random data and a random result are derived the user or system still has the ability to store the original conditions and recreate them for testing without compromising the randomness.

3. The invention allows the originating information to be passed through a transform with many variables that are also randomly controllable, and the resulting possibilities are also increased.

4. The invention allows the transformations to be cascaded: output from one being the input to another and so on. The results create a non reversible output thus satisfying the principle of random: A process that is not backward reversible can't be forwardly predicted either.

KEY TO FIGURES, DIAGRAMS AND SCHEMATICS AND OBJECTS

The following numbers are used to describe the objects, inputs, outputs and principle actions that comprise the example. The numbers are underlined to denote the number being an identifier so as to distinguish from the numbers and values used in the examples themselves.

01 The Transform Process as a whole
02 The Baseline
03 An Input Source
04 Lookup Table or equivalent (Optional or implicit)
05 Random Source of Information (Optional)
06 Output from the Transform
07 Decision to choose from one input source or the other (Optional)
08 Decision to apply a change to the marker position (Optional or implicit)
09 Decision to switch from prefix to suffix or suffix to prefix (Optional or implicit)
10 Decision to select a different collection of equivalent values to represent the input values
11 NOT Operation
12 Intermediary step of the transform used to show the values, changes and effects during the transformation
13 Explicit or implicit setting of a Block size
14 Input Source Processing
15 Decision for differing blocks sizes
16 Decision for differing input sources
17 End bit of transformed data
18 End of last physical byte in a transform
19 Record or field used in a search
20 Records or fields in a database
21 Records or fields that could be the same value

KEY TO OPERATIONS

The format OP1, OP2, . . . OPn is used to denote a set of operational steps in some of the Figures. When used they are explicitly mentioned in the text and try to simplify the steps, not in a fixed order but in an order that will derive the intent and result of the transformation.

It is clear that real world usage when compared to these examples can have an actual order of operations that are different and that the values can and will be different but the net effect of the transform will still remain the same both in outcome and intent of the desired embodiments.

DETAILED DESCRIPTION OF DIAGRAMS

FIG. 1 shows a method according to an exemplary embodiment of the present invention wherein a sequence of binary data is input into an input 101. The input comprises any type of suitable means capable of receiving the input data to be transformed. The input data received may originate from a number of different sources. The input data is processed by the present invention as a stream or sequence of input binary bits. The stream of input data may be of predictable i.e. known length, or unpredictable i.e. unknown length. After having been input, the input sequence of bits are divided into smaller segments or blocks of bits as indicated by divider 102 in FIG. 1. The number of bits in each segment divided out of the input data sequence of bits i.e. size of each segment, may be any number of bits e.g. 1 bit, 2 bits, 3 bits to n bits. The size of each segment may be fixed for the entire stream of input data, but may also vary for the stream of input data.

In the example shown in FIG. 1, the input stream of data (11011000) is divided into 2-bit segments at step 102 thus resulting in the four segments 11-01-10-00. Rather than viewing the input stream of data as a whole i.e. 11011000, once divided into segments as outlined above, each of the segments are then effectively viewed individually. In the next step, as shown by reference 103 in FIG. 1, a respective value is determined for each of the individual segments.

The value for each segment may comprise the actual calculated decimal value of the, in this case, 2-bit segment i.e. the four segments may be calculated as follows 11=3, 01=1, 10=2 and 00=0. However, as indicated in FIG. 1, this is by no means necessary as the values determined for each individual segment may not necessarily be equal to the actual calculated value of the given segment.

In an embodiment of the present invention, the plurality of values may also be obtained from a look-up table 104, which contains a set of individual values corresponding to the different combinations of bits in each segment. However, as indicated in FIG. 1, this is also optional.

In the present example it can be seen that the value of 2 is determined for the combination of bits of the first segment 102a i.e. 11. For the second segment of bits in 102b with the combination of bits 01, a value of 3 is determined. The third segment of bits 102c has a combination of 10 wherein a value of 1 is determined therefor. The fourth segment of bits 102d has a combination of 00 a respective value of 0 is determined therefor.

Each of these respective corresponding values determined for each of the segments are then used to determine where a predetermined transformation should be applied to a further sequence of bits known as the baseline 107.

In an embodiment of the present invention, the respective values determined for each of the respective individual segments form the basis for a counting operation which is performed on each of said values. The counting operation may comprise either counting down from each respective value to zero or starting at zero and counting up to the respective value. The example in FIG. 1 shows how a counter 105 uses the respective values for performing the counting operation. The example shows a counter, which counts down from the value until zero i.e. a decrementing counter. In 105a it can be seen how the value 2, which was determined for segment 102a, is counted 3 times i.e. 2-1-0. Each count effectively generates a tally mark wherein each tally mark may be used to determine whether to apply a predetermined transformation as shown in 106a and described below. 105b of FIG. 1 shows that the value 3, determined for the second segment 102b, is counted 4 times i.e. 3-2-1-0 wherein each count also generates tally mark i.e. a total of 4 tally marks. Further, in 105c the value 1 determined for the third segment 102c is counted twice i.e. 1-0 thereby generating 2 tally marks. For the fourth segment 102d wherein the value 0 was determined, a counting operation is performed only once i.e. 0 thereby generating a single tally mark.

As can be seen from reference 106 in FIG. 1, the counting operations performed on each of the values 103a-d determined for each of the segments 102a-d effectively generate a set of tally marks which may be used as instructions to determine whether to apply a predetermined transformation to respective bits of a baseline sequence of bits 107. This set of instructions may comprise a transformation or plurality of transformations to denote a number of bits which are to be taken from the baseline sequence of bits 107 corresponding to each respective count of each value 103a-d determined for each segment 102a-d divided from the input data 101.

It will be understood by the skilled person that there are many ways by which the values 103a-d may be converted into a set of predetermined transformations according to the present invention. For example, one of the tally marks from a set corresponding to a particular determined value may comprise an instruction to perform a predetermined transformation on a particular bit (from the baseline sequence of bits), whilst the others in the given set of tally marks may comprise the opposite instruction. In this manner, one embodiment of the present invention enables the possibility to represent the determined values 103a-d within a sequence of bits by means of tally marks 106a-d, of a particular set corresponding to a particular determined value, that effectively act as a prefix or suffix in relation to the other tally marks in that given set. Such an embodiment effectively enables the separation of one set of tally marks 106a-d corresponding to a particular determined value 103a-d, from a next or neighbouring set of tally marks which may correspond to a different determined value 103a-d. Thus, in other words, in one embodiment, the tally marks can be used in order to denote differentiation between the determined values 103a-d corresponding to divided segments 102a-d of input data 101. This is because the tally marks may determine whether and where various individual transformations should be applied to a sequence of baseline bits 107, and, for example, said transformations may be different for different neighbouring determined values 103a-d.

The predetermined transformation, which may comprise a sequence of individual transformations, to be performed on the sequence of baseline bits may comprise an operation that performs a logical negation, such as a bitwise NOT which, when applied to a particular baseline bit, inverts the state of that bit. Equally, the tally marks may also comprise the inverse thereof i.e. not performing a transformation on a particular bit taken from a baseline sequence of bits i.e. not inverting the state of the particular bit.

In the present example, according to FIG. 1, it can be seen that the determined value 103a corresponding to the first segment 102a forms a set of tally marks by means of the counting operation, wherein the first two tally marks 106a(i) and (ii) indicate that no transformation should be performed on the respective bits of the baseline sequence of bits 107, whereas the last tally mark 106a(iii), generated by means of the counting operation having reached zero, indicates that a transformation, such as the bitwise NOT operation described before, should be performed on a respective bit from the baseline sequence of bits i.e. therefore in this particular example the last tally mark of set 106a(i)-(iii) effectively acts as a so-called suffix with respect to the other tally marks in the set 106a(i) and (ii). Further, as regards the other determined values 103b-d, these are also represented in the same manner i.e. by performing the (decrementing) counting operation on each of the values in order to generate a set of tally marks wherein when the counting operation reaches zero, the last tally mark generated thereby determines that a transformation should be performed on the baseline sequence of bits 107.

The further sequence of bits known as the baseline may comprise any logical source of binary data. The individual bits of the sequence of baseline bits may comprise either all logical 0s, or all logical 1s. Furthermore, the baseline sequence may also comprise a fixed sequence, which merely repeats e.g. 11100100-11100100 . . . etc. However, the baseline sequence of bits may also comprise a completely random combination of logical 1s and 0s. In the present example illustrated in FIG. 1, the baseline 107 consists of a sequence of 10 bits, which are all logical 0s in this case.

The set of tally marks 106a-d derived from the determined values 103a-d may then be used to perform the respective transformations on the baseline sequence of bits. As shown in FIG. 1, for each tally mark in the sequence generated in 106, a bit is acquired from the baseline sequence of bits 107 and the instruction to either perform a transformation on the bit or not is carried out before appending the bit to an output sequence of bits 108. For example, as can be seen from FIG. 1, the first tally mark 106a(i) of the set of tally marks 106a(i)-(iii) which correspond to the first determined value 103a indicates that no transformation should be performed on the bit 107a(i) acquired from the baseline. Therefore, the bit 107a(i), which as explained before has the value of 0, is simply appended to the output sequence of bits without being transformed i.e. inverted, thereby forming the first bit 108a(i) of an output sequence of bits i.e. 0. Further, the next tally mark 106a(ii) in the set 106a(i)-(iii) also indicates that no transformation should be performed on a subsequent bit 107a(i) acquired from the baseline sequence of bits. Therefore, the subsequent bit 107a(ii) is simply appended to the output sequence of bits without being transformed, thereby forming the second bit 108a(ii) of the output sequence of bits with a value of 0. However, the last tally mark 106a(iii) in the set indicates that a transformation should be performed on the next bit 107a(iii) acquired from the baseline sequence of bits 107, before appending it to the output sequence of bits. Therefore, a transformation is performed on the next bit 107a(iii), which has the value of 0, before appending it to the output sequence of bits. Thus the bit 107a(iii) is inverted resulting in a bit with the value of 1, which is then appended to the output sequence of bits, thereby forming the third bit 108a(iii) of an output sequence of bits.

This process is performed for all subsequent sets of tally marks 106b-d corresponding to the second, third and fourth determined values 103b-d thus resulting in an output sequence of transformed bits 108.

In other words, the baseline effectively provides a sequence of bits 107 which are manipulated through transformations in such a manner that the final output stream of bits 108 no longer resembles the input data stream of bits 101, and yet contains all the relevant information of the input stream.

In another embodiment of the invention, the form in which this relevant information is contained in the output stream may be such that the output stream may be transformed back into the original form of the input stream if desired. Furthermore, in yet another embodiment of the present invention, it may be desired that the output stream of bits 108 does not derive any meaning, in particular no such meaning in relation to the original input data 101. In another embodiment, the output sequence may be stored and/or analysed in conventional form i.e. by any available and suitable means which has the ability to recognise the information, for example, in terms of bytes. In a further embodiment, the method of the present invention may be used to effectively record the individual determined values 103 corresponding to segments of the input information 101 and representing them merely by means of reference to the number of bits associated with each determined value.

In yet another embodiment, the transformed output data may additionally be stored and/or analysed in a new i.e. non-conventional manner wherein the number of bits which represent the individual determined values for the segments may be stored as a value wherein said value may be used to determine similarity, not the same or other logical values.

Figure 2:
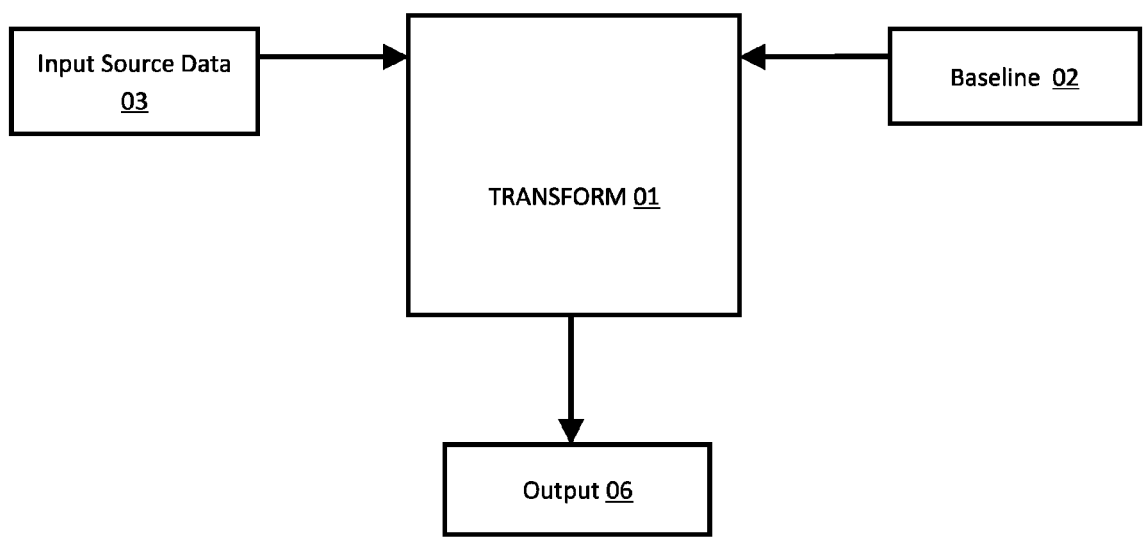
FIG. 2 illustrates a schematic of a fundamental transformation.

FIG. 2—Schematic of a Fundamental Transformation

The following schematic shows the fundamental inputs for a transformation described in this invention. The input source to be transformed (03) is input into the transform function (01) in segments. These segments are used to determine whether to leave unchanged or perform NOT operations on bits obtained from the baseline (02). Bits from the baseline (02) whether unchanged or changed are passed through to the output (06).

Figure 3:
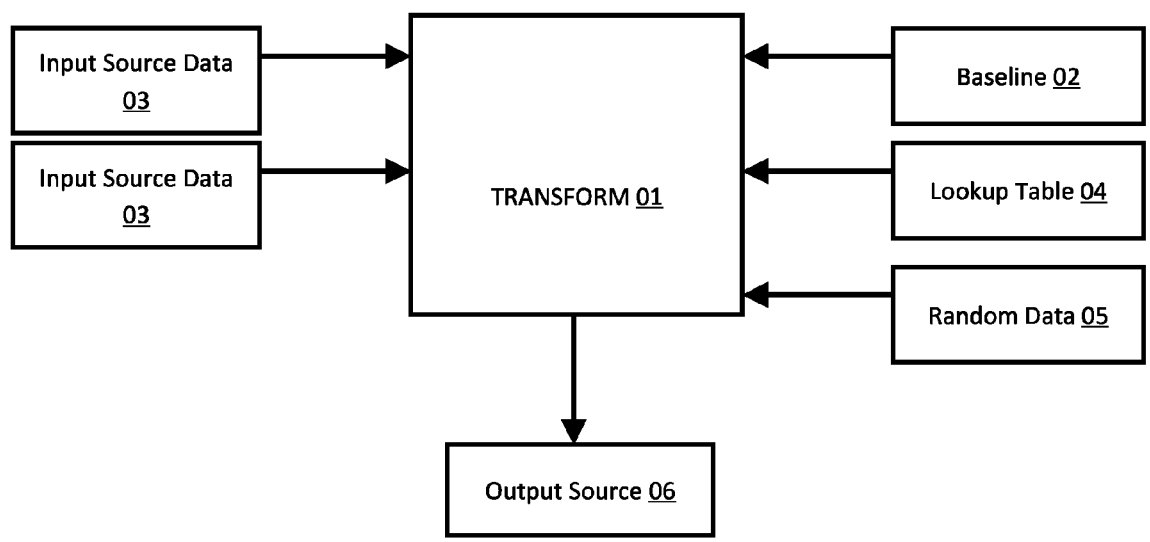
FIG. 3 illustrates a schematic of functional enhancements & additions to the transformation.

FIG. 3—Schematic of Functional Enhancements & Additions to the Transformation The following schematic shows the inputs and features for a full transformation making use of many of the enhancements described in this patent. The input source to be transformed (03) is input into the transform function (01) in segments. These segments are used to determine whether to leave unchanged or perform NOT operations on bits obtained from the baseline (02). Bits from the baseline (02) whether unchanged or changed are passed through to the output (06).

Each segment from the input source (03) has an implicit value, but also has the ability to be replaced with an alternate value, through a lookup table (04).

Transformations may take more than one input source (03) and alternate between segment(s) from one and segment(s) from the other. Alternating between one input and the other the differing sources can be derived from the Random data (05).

Transformations may take more than one input source (03) whereby one or more input sources (03) are actually Random Data (05).

Figure 4:
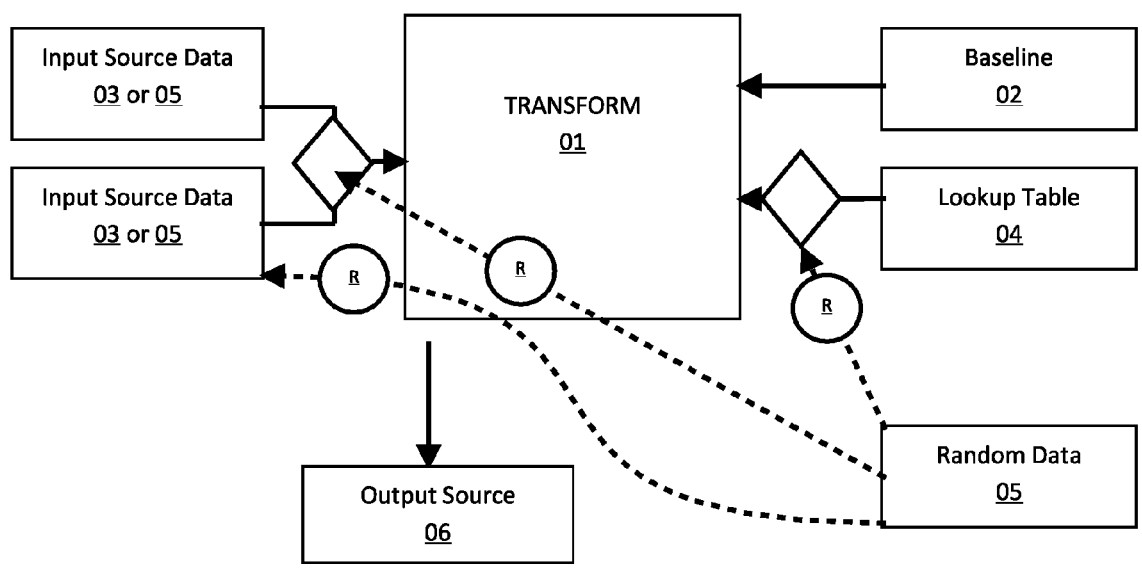
FIG. 4 illustrates a schematic of the Optional Influences of Random Data in the Transform.

FIG. 4—Schematic of the Optional Influences of Random Data in the Transform

The following schematic shows the optional integration of Random Data (05) in the operational decisions and settings that a full transformation (01) can make use of A transform optionally can use Random Data (05) as an alternate input source (03), represented through the (R1).

A transform optionally can use Random Data (05) as a triggering mechanism to determine which input data sources (03 . . . ) is to be used and the amount of segments that should be included, and is represented through the (R2).

A transform optionally can use Random Data (05) as a triggering mechanism to determine which lookup table (04) equivalency values are to be used and is represented through (R3).

Although not shown in the diagram, the baseline (02) can also be derived from or be random (05).

Figure 5:
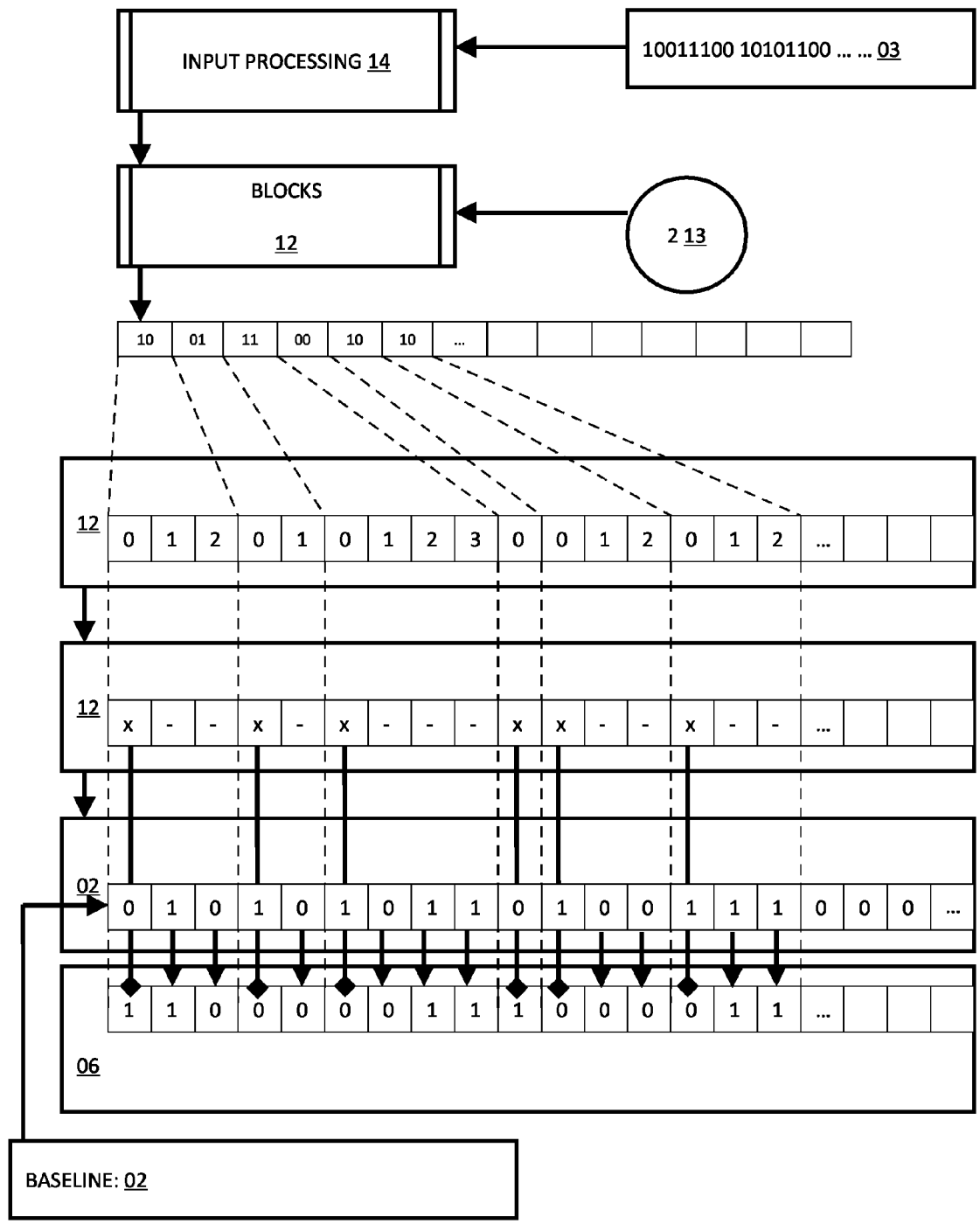
FIG. 5 illustrates an example of a Transform with 2 bit Block, Prefix Marker, Marker=NOT, implied lookup, Single Input Source.

FIG. 5—Example of a Transform with 2 Bit Block, Prefix Marker, Marker=NOT, Implied Lookup, Single Input Source.

The following example of a transformation uses an initially set block size of 2 bits, with a single input source (03), a prefix based transformation where the marker is denoted with the NOT operation applied to the baseline and a spacer is denoted with no change to the baseline.

In this example the input source (03) is processed in the transformation and is assumed to be a file or memory location and loaded. The loading process is dependent upon the source and its location. The input source is broken into segments based upon a block size; in this example the block size of 2 bits has been chosen.

The segments are taken at face value and determine the number of bits passed from the baseline to the output without change. Prior to each segment being transformed a single bit is taken from the baseline and the NOT operation is applied. This resulting value is appended to the output.

Figure 6:
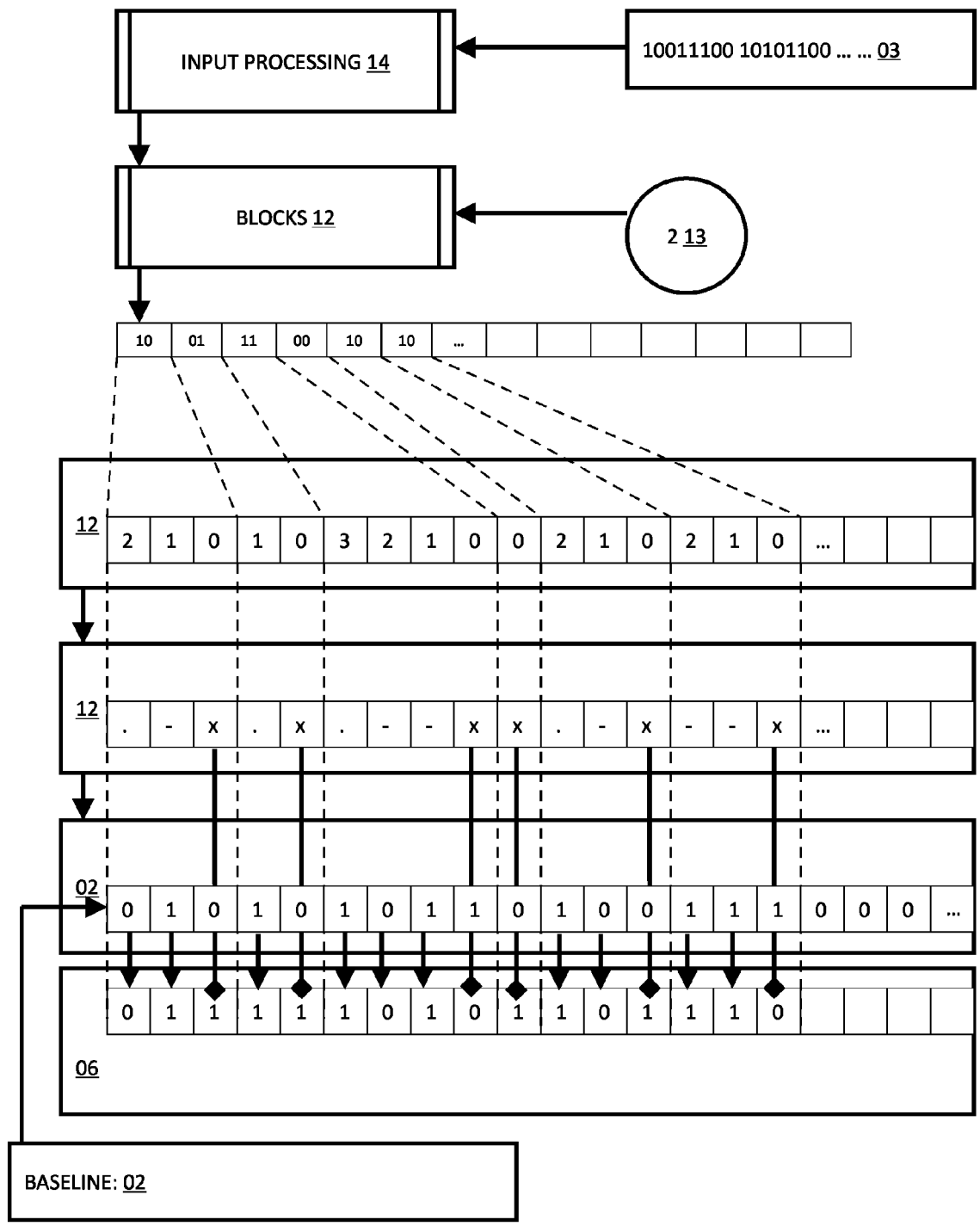
FIG. 6 illustrates an example of a Transform with 2 bit Block, Suffix Marker, Marker=NOT, implied lookup, Single Input Source.

FIG. 6—Example of a Transform with 2 Bit Block, Suffix Marker, Marker=NOT, Implied Lookup, Single Input Source.

The embodiment of FIG. 6 differs from the embodiment of FIG. 5 in that the marking is performed at the end of the processed data blocks, referred to as Suffix Marker. This has the effect that the resulting output differs.

Figure 7:
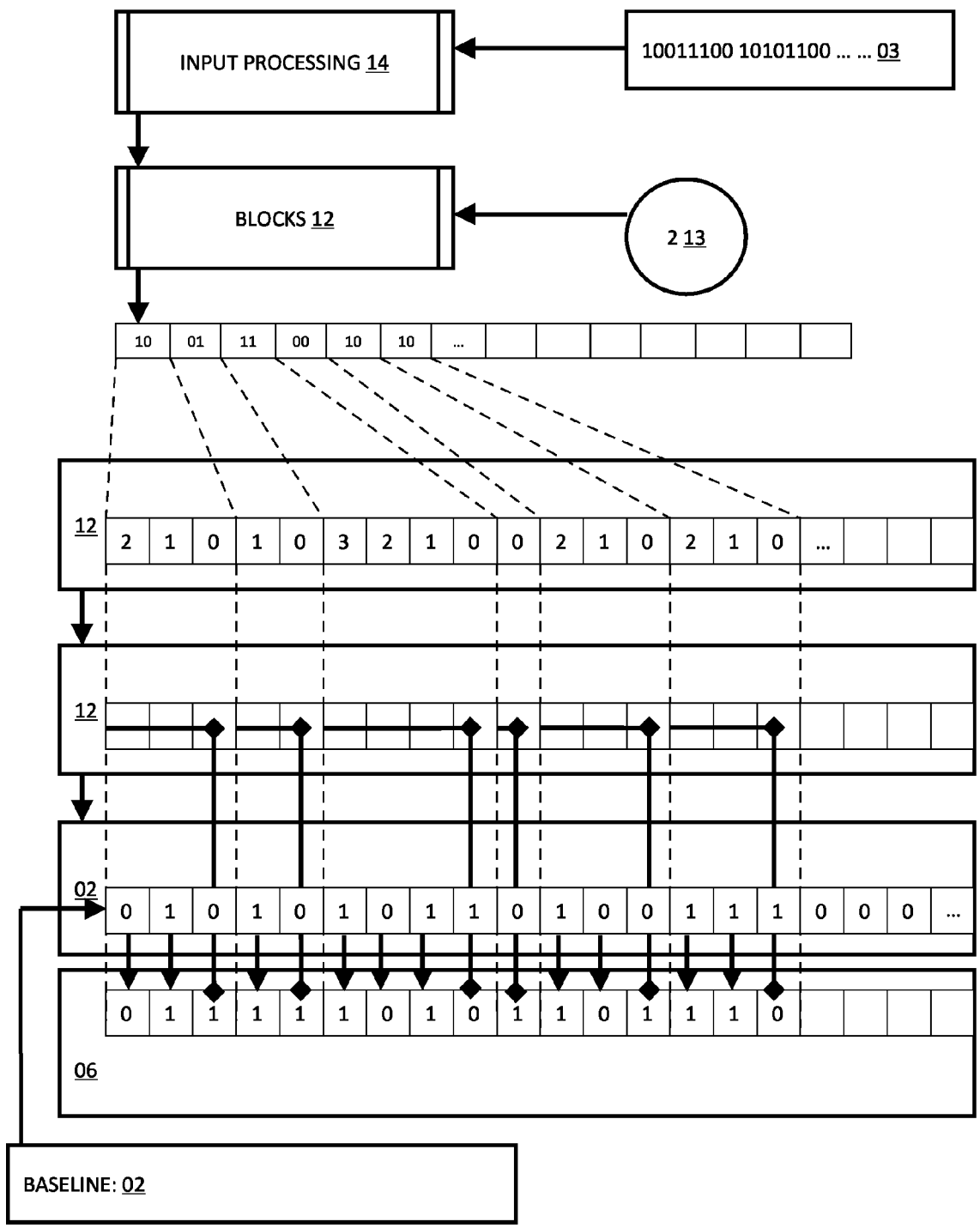
FIG. 7 illustrates an example of a Transform with 2 bit Block, Suffix Marker, Marker=NOT, implied lookup, Single Input Source. As per FIG. 5 but alternative representation.

FIG. 7—Example of a Transform with 2 Bit Block, Suffix Marker, Marker=NOT, Implied Lookup, Single Input Source. as Per FIG. 5 but Alternative Representation.

The embodiment of FIG. 7 does not differ from the embodiment of FIG. 6. This diagram shows more graphically the implementation and use of the markers and the effect in the resulting output.

Figure 8:
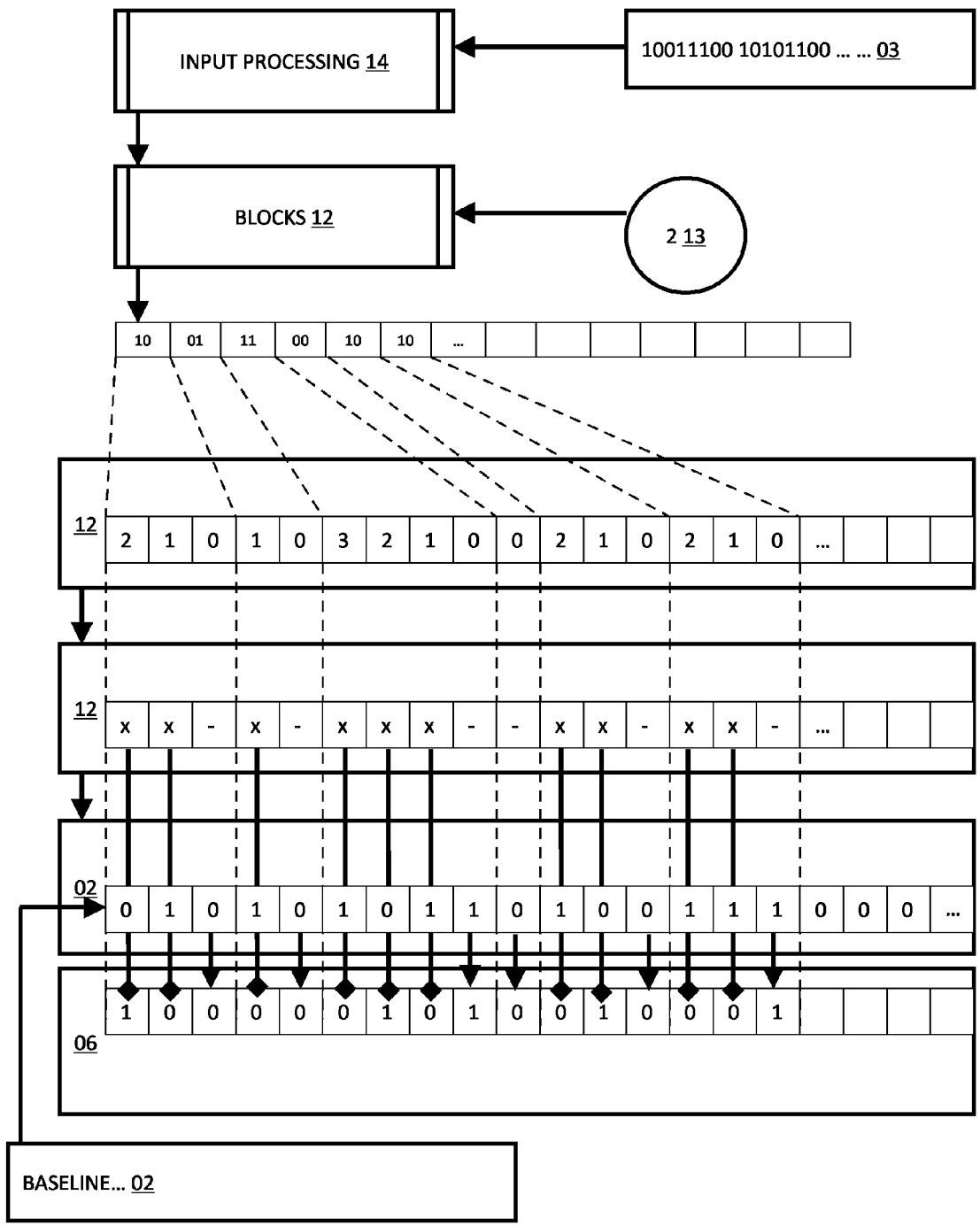
FIG. 8 illustrates an example of a Transform with 2 bit Block, Suffix Marker, Space=NOT, implied lookup, Single Input Source.

FIG. 8—Example of a Transform with 2 Bit Block, Suffix Marker, Space=NOT, Implied Lookup, Single Input Source.

The embodiment of FIG. 8 differs from the embodiment of FIG. 5 in that the markers are represented by not performing a NOT operation, but the data that is represented through spaces uses the NOT operation. This has the effect that the resulting output differs.

Figure 9:
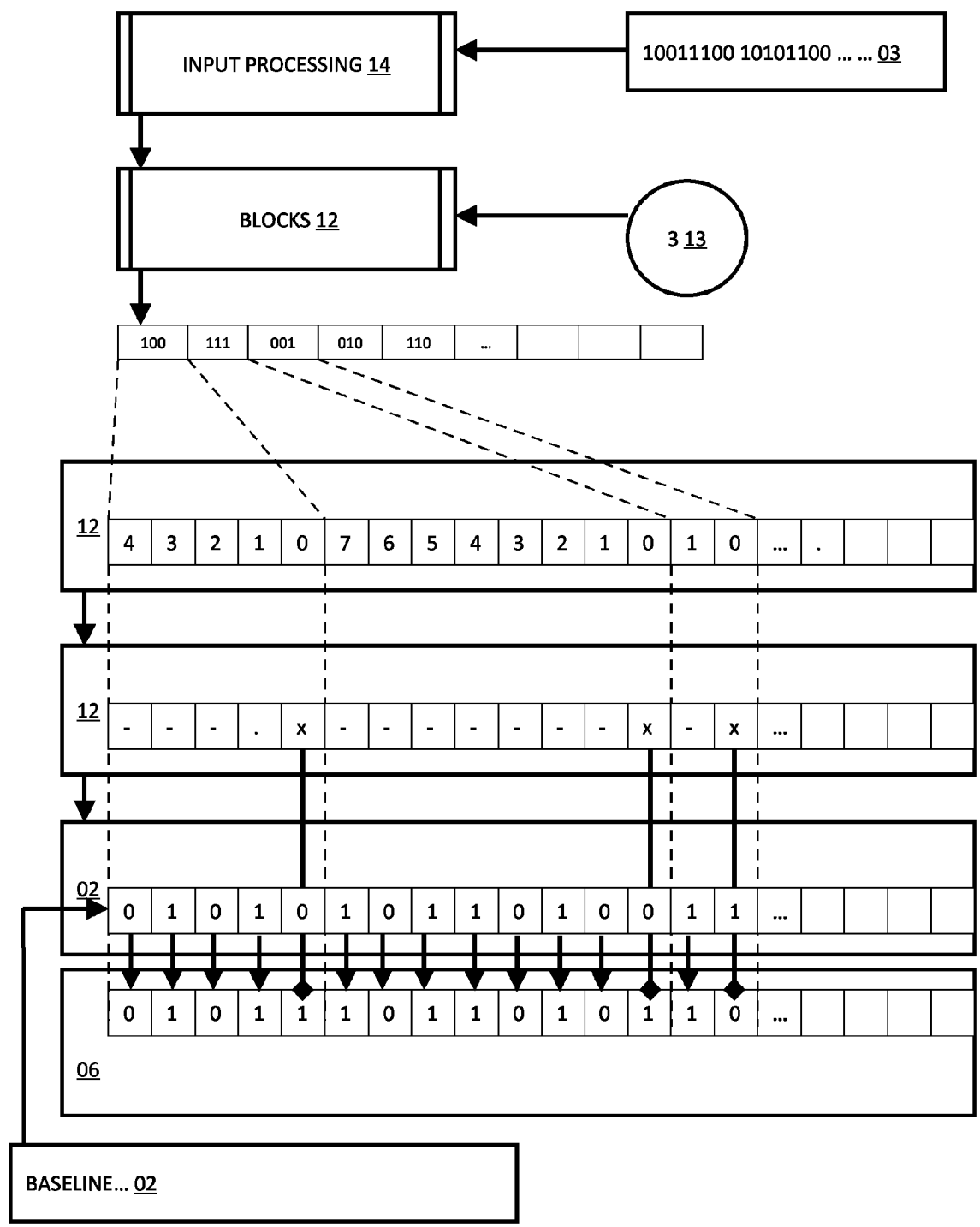
FIG. 9 illustrates an example of a Transform with 3 bit Block, Suffix Marker, Marker=NOT, implied lookup, Single Input Source.

FIG. 9—Example of a Transform with 3 Bit Block, Suffix Marker, Marker=NOT, Implied Lookup, Single Input Source.

The embodiment of FIG. 9 differs from the embodiment of FIG. 6 in that input is transformed based upon blocks of 3 bits. FIG. 6 uses a block size of 2 bits. This has the effect that the resulting output differs.

Figure 10:
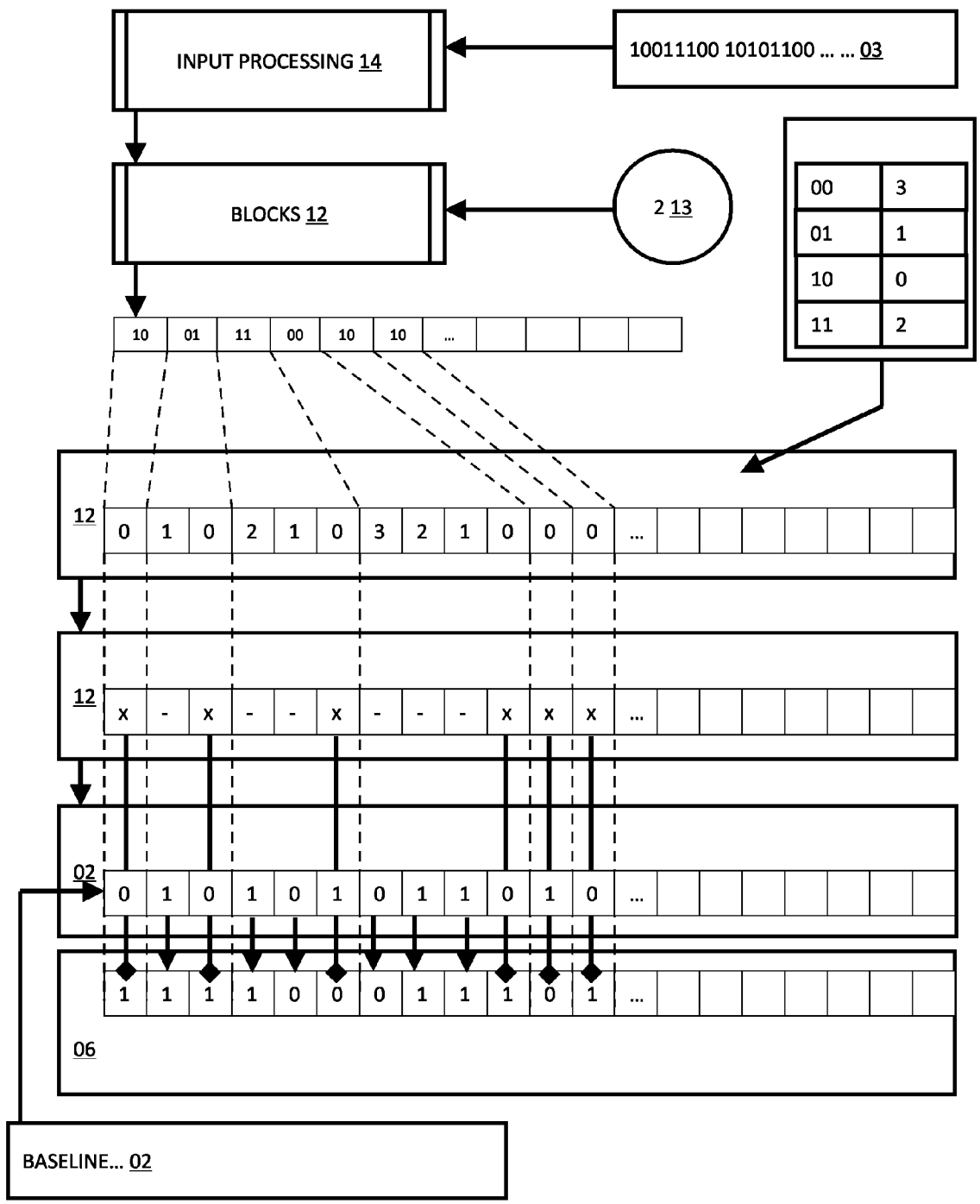
FIG. 10 illustrates an example of a Transform with 2 bit Block, Suffix Marker, Marker=NOT, static lookup, Single Input Source.

FIG. 10—Example of a Transform with 2 Bit Block, Suffix Marker, Marker=NOT, Static Lookup, Single Input Source.

The embodiment of FIG. 10 differs from the embodiment of FIG. 5 in that the markers are represented by not performing a NOT operation, but the data that is represented through spaces uses the NOT operation. In addition blocks, prior to being transformed, are given an equivalent value that is then used for the transformation. This has the effect that the resulting output differs.

Figure 11:
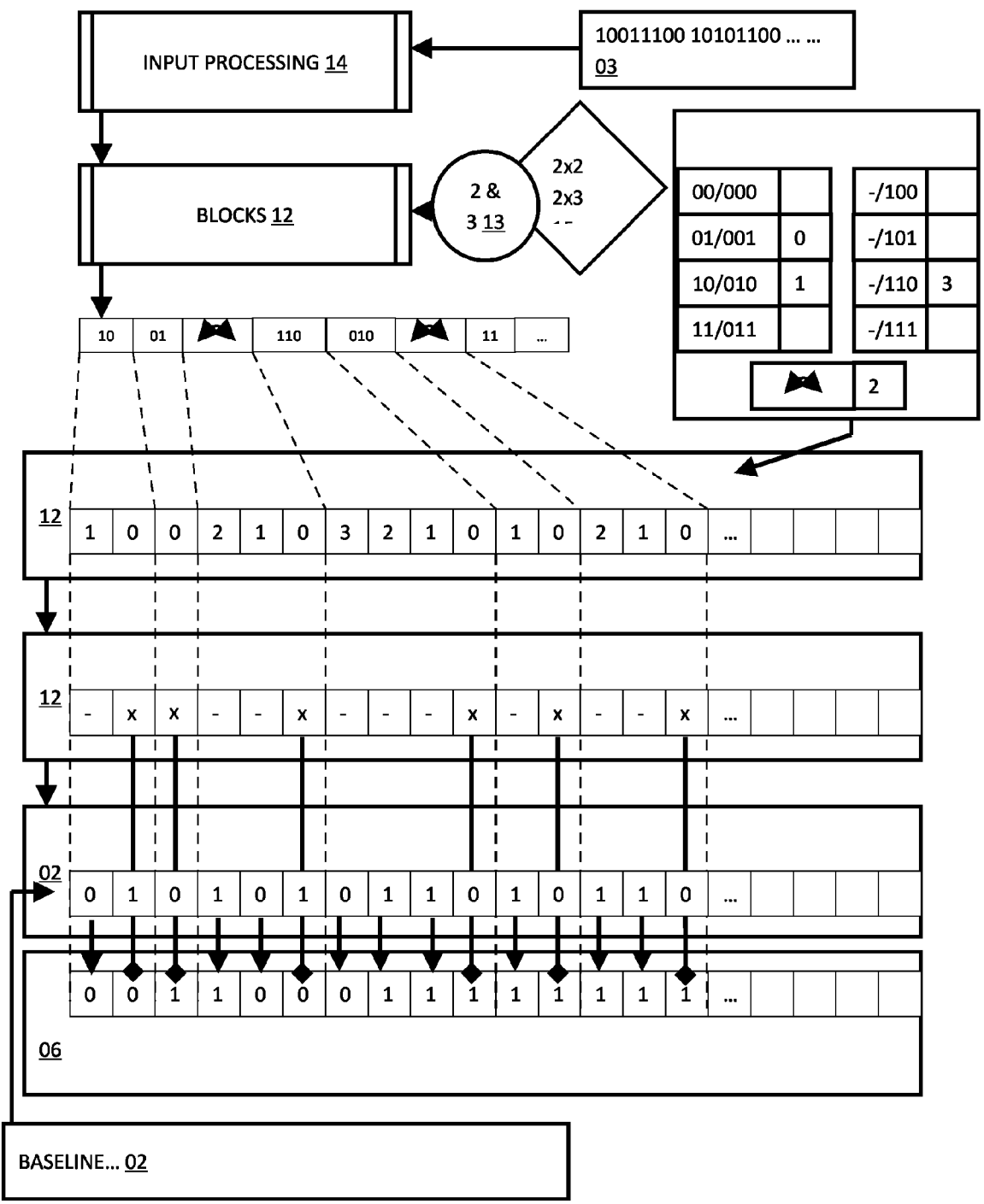
FIG. 11 illustrates an example of a Transform with 2 & 3 bit Blocks, Suffix Marker, Marker=NOT, static lookup, Single Input Source.

FIG. 11—Example of a Transform with 2 & 3 Bit Blocks, Suffix Marker, Marker=NOT, Static Lookup, Single Input Source.

The embodiment of FIG. 11 differs from the embodiment of FIG. 6 in that the transform uses a mixture of block sizes of 2 bits and 3 bits, in addition these blocks prior to being transformed are given an equivalent value that is then used for the transformation. This has the effect that the resulting output differs. In this example the transformation is performed upon two blocks of two bits, followed by two blocks of three bits and so on. This is represented by the label (15).

Figure 12:
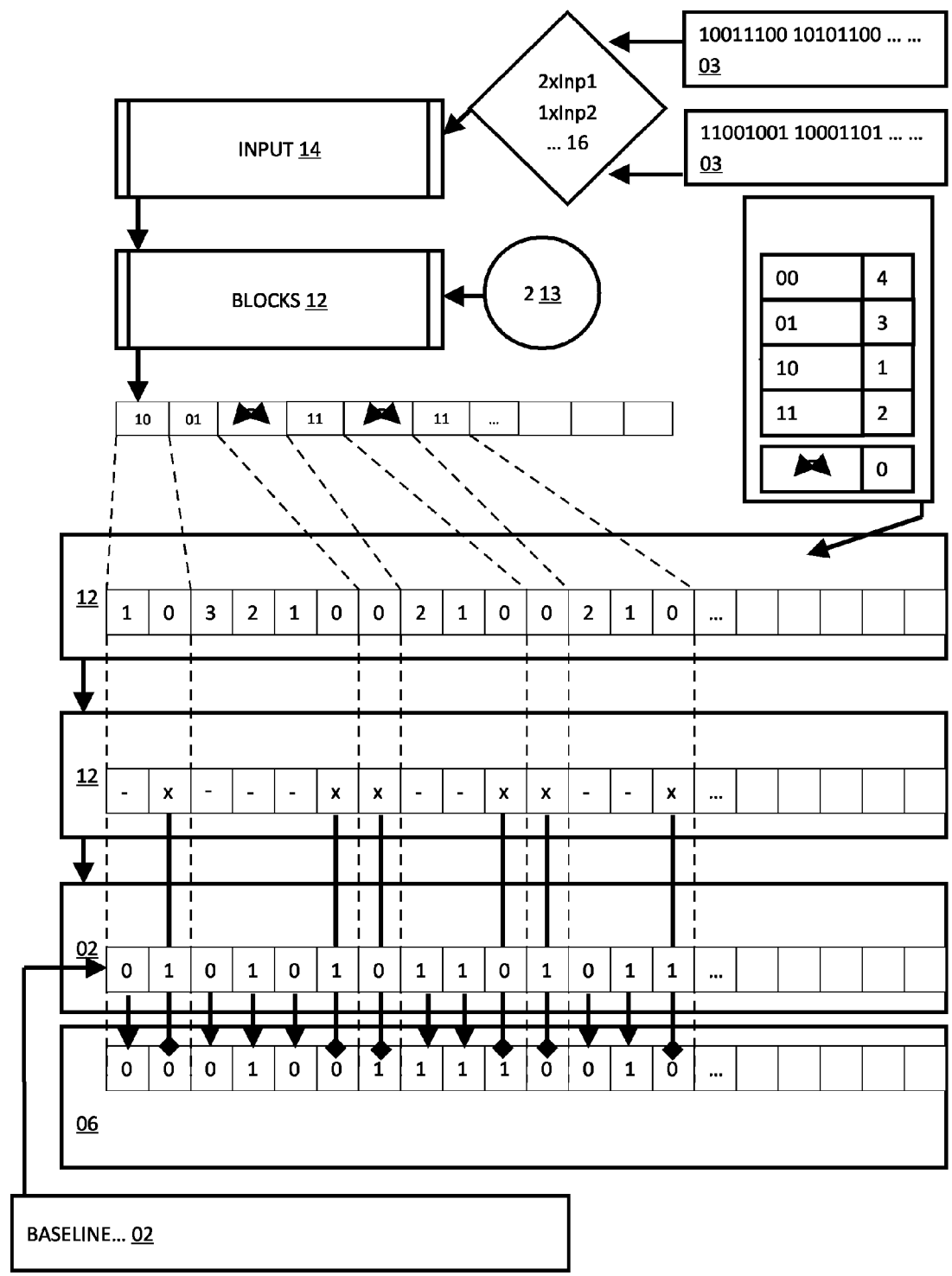
FIG. 12 illustrates an example of a Transform with 2 bit Block, Suffix Marker, Marker=NOT, static lookup, Double Input Source.

FIG. 12—Example of a Transform with 2 Bit Block, Suffix Marker, Marker=NOT, Static Lookup, Double Input Source.

The embodiment of FIG. 12 differs from the embodiment of FIG. 10 in that the transform processes two input sources. In this example the input sources could both be data or one or more could be a random source of information. This has the effect that the resulting output differs.

Figure 13:
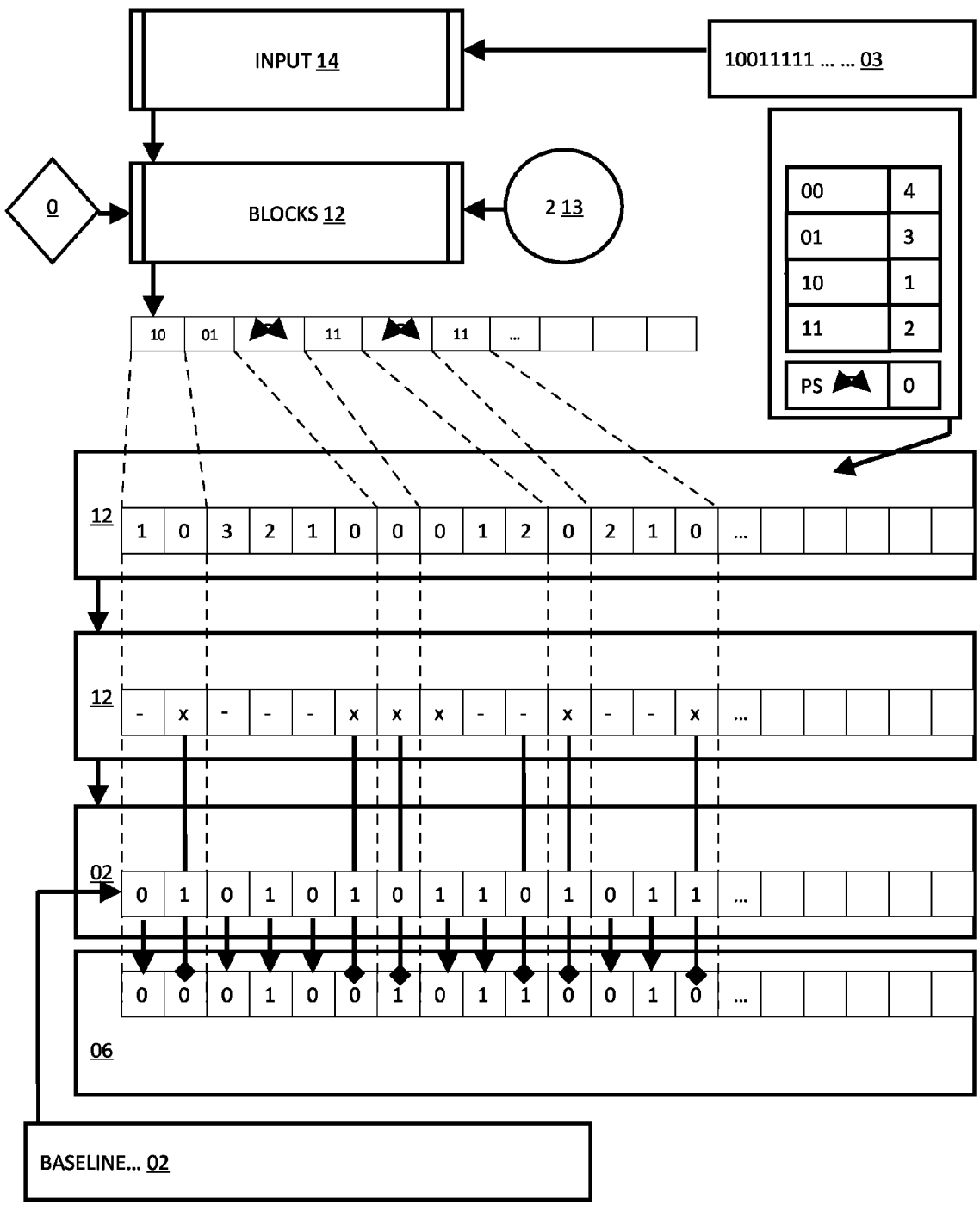
FIG. 13 illustrates an example of a Transform with 2 bit Block, Prefix and Suffix Markers, Marker=NOT, static lookup, Single Input Source.

FIG. 13—Example of a Transform with 2 Bit Block, Prefix and Suffix Markers, Marker=NOT, Static Lookup, Single Input Source.

The embodiment of FIG. 13 differs from the embodiment of FIG. 5 in that the markers make use of and support both the Prefix and Suffix Markers during the transform. This has the effect that the resulting output differs.

Figure 14:
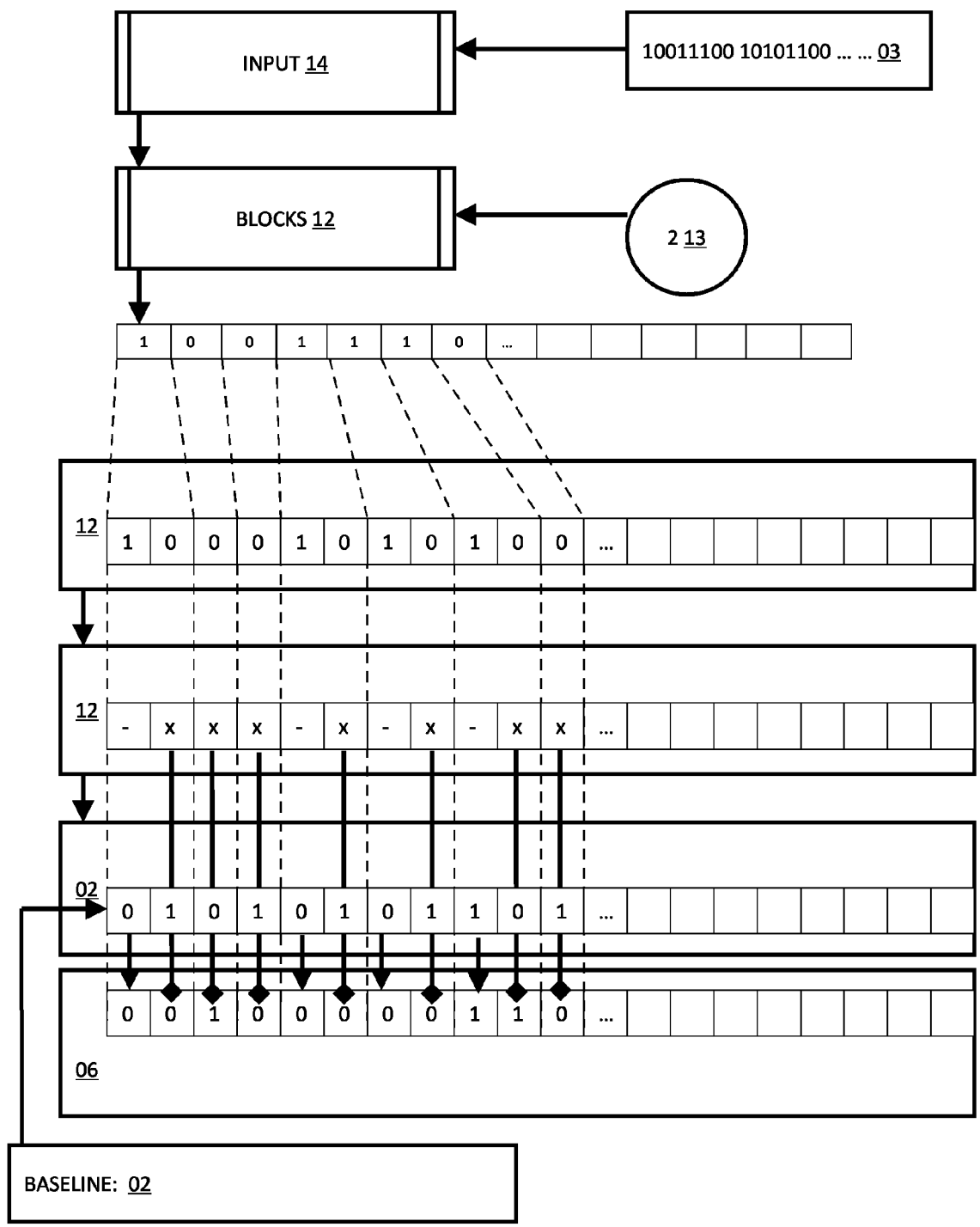
FIG. 14 illustrates an example of a Transform with 1 bit Block, Suffix Marker, Marker=NOT, implied lookup, Single Input Source.

FIG. 14—Example of a Transform with 1 Bit Block, Suffix Marker, Marker=NOT, Implied Lookup, Single Input Source.

The embodiment of FIG. 14 differs from the embodiment of FIG. 6 in that a block size of 1 bit has been used. This has the effect that the resulting output differs.

Figure 15:
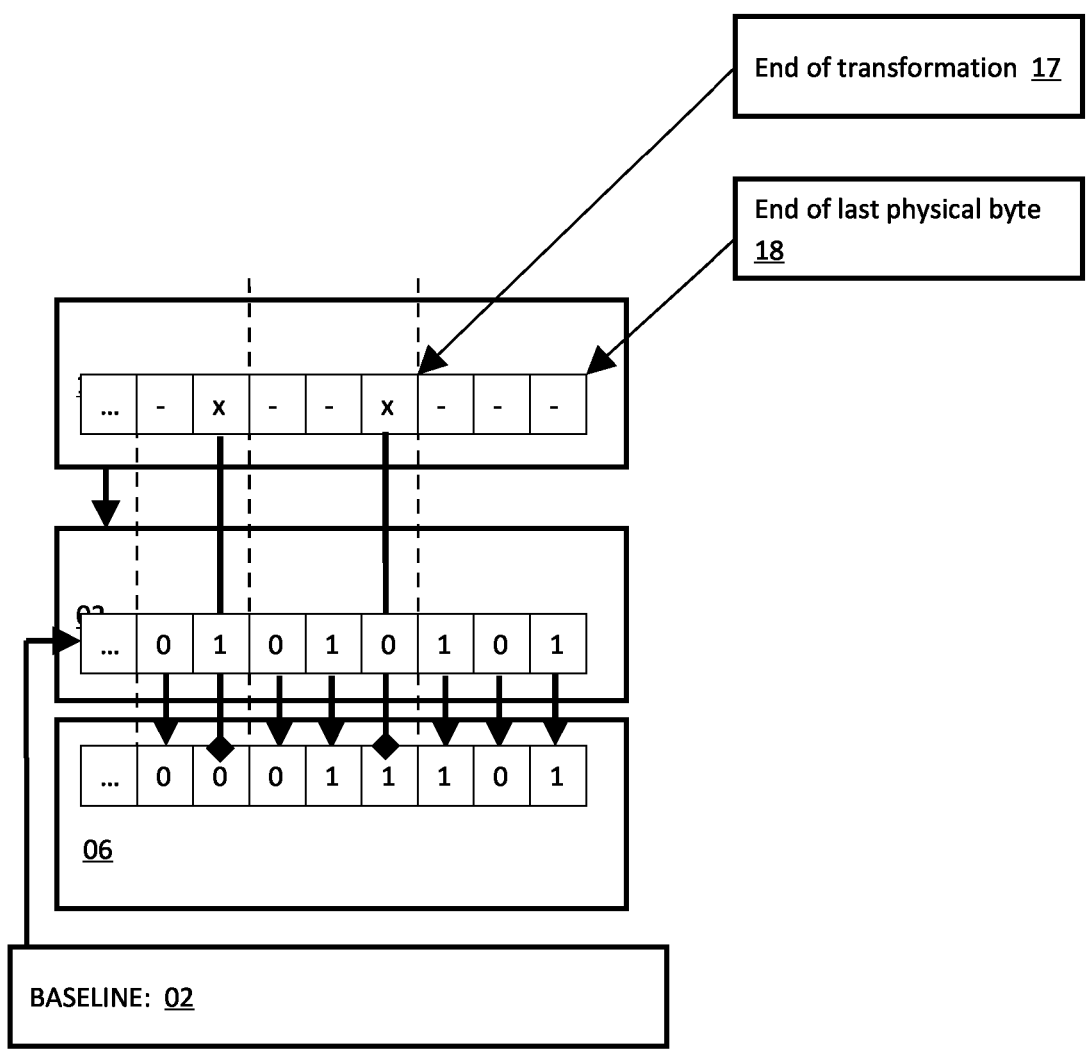
FIG. 15 illustrates an example of padding the end of a transformation to support memory based upon fixed byte sizes.

FIG. 15—Example of Padding the End of a Transformation to Support Memory Based Upon Fixed Byte Sizes.

The following example shows how the actual values applied to the remaining bits in the last output byte could be applied.

Figure 16:
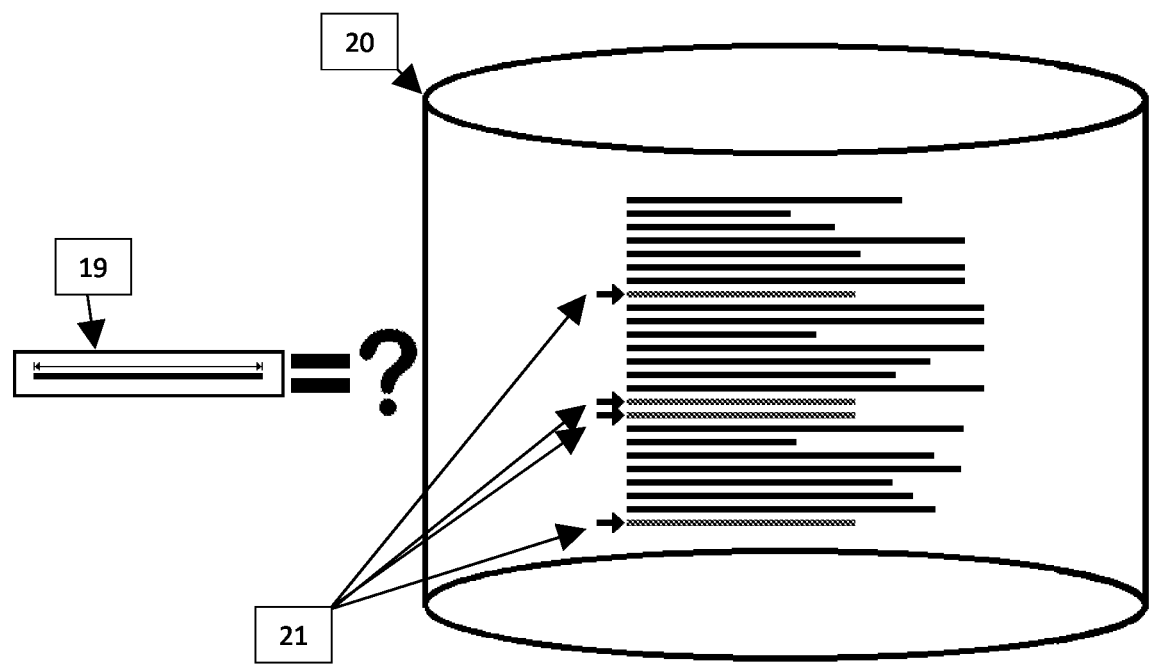
FIG. 16 illustrates an example schematic showing the work reduction in a non indexed database search using data prepared with the transformation.

FIG. 16—Example Schematic Showing the Work Reduction in a Non Indexed Database Search Using Data Prepared with the Transformation.

The following example schematic shows that the transformed data when applied to a database of records, or fields provides a different view of the data that is currently not available. Most databases and file storage systems store data in fields of fixed length of sufficient size for all possibilities that may be needed. This means that one field or record is always the same size as another even when the data stored within the space is totally different.

Transformed data produces an output that has a length that is dependent on the data values and while this does not provide the entire basis for a check it does allow the fast exclusion of records or fields that cannot be the same, thus increasing the performance of such checks.

This exclusion process is still possible even when the records are encrypted with a key unknown to the operator.

Figure 17:
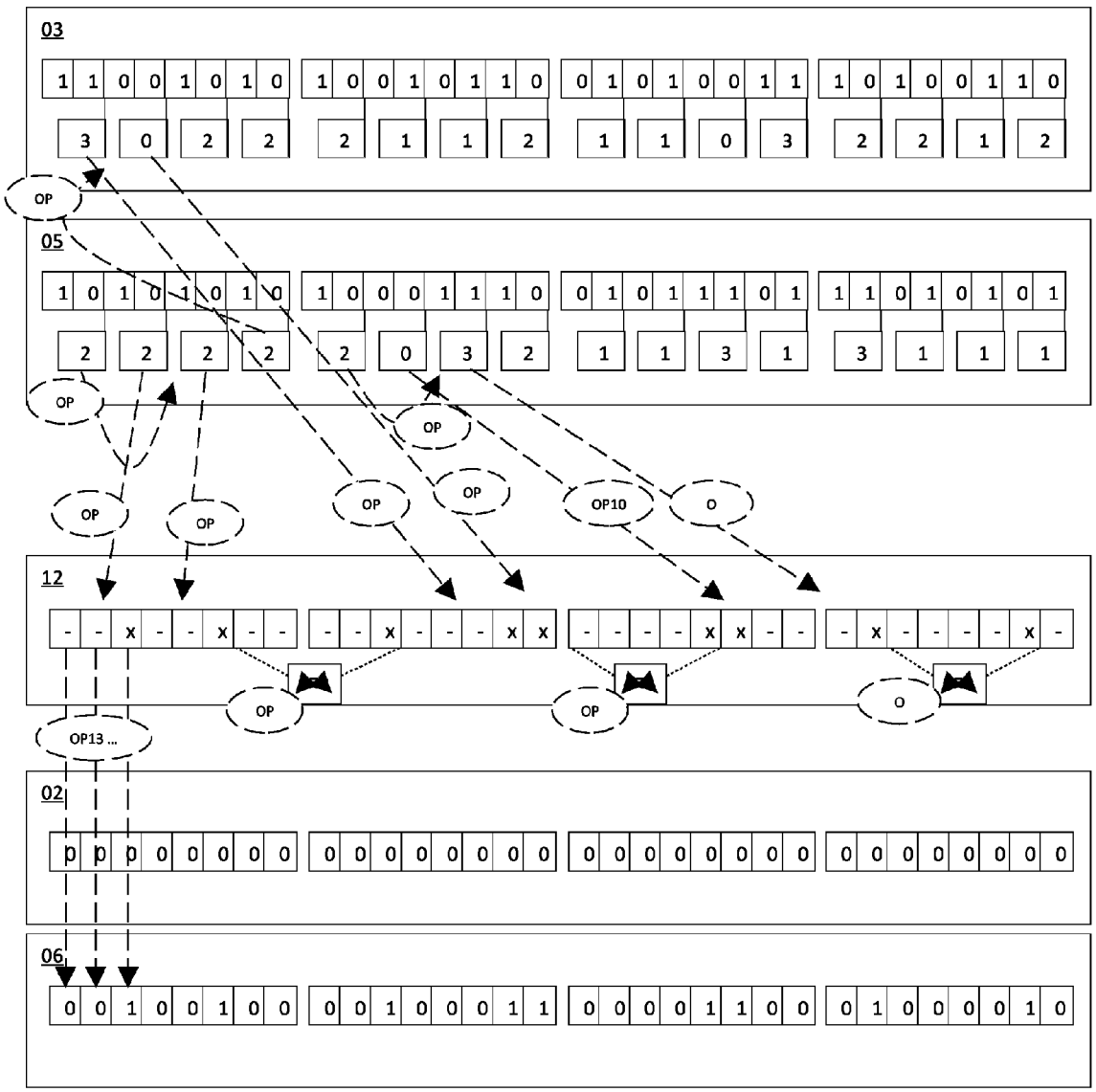
FIG. 17 illustrates an example of random integrated encryption.
Figure 17:
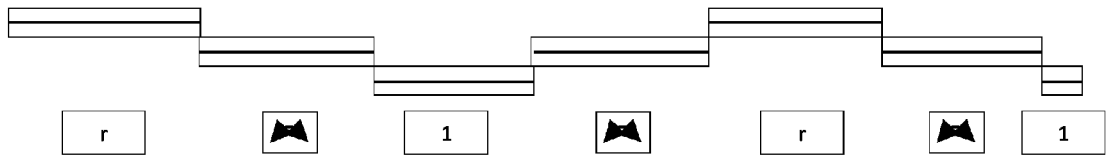

FIG. 17—Example 1 of Random Integrated Encryption.

The following example shows a possible implementation of the transformation making use of an input source (03) together with a random source (05). The random source (05) being used for both decision making and as a source of information to be included in the transformation. With this example the output from the transform (06) can be seen to be made up from the input source (03), portions of the random source (05), and the baseline (02).

The operations show one example of how such a transformation can be performed. For the purposes of this example a block size of 2 bits has been chosen for both the input source (03) and for the random source (05). The random source (05) is used for both the determination of how much processing is performed prior to alternating between input source (03) being applied and random information from the random source (05) being included.

OP1: The initial block of the random source, marked as OP1, is used to determine the amount of random source information that should be included.

OP2&OP3: The blocks determined from OP1 are transformed; this is represented in OP2 & OP3.

OP4: The swapping between the sources, input source (03) and random source (05), is denoted with a transform marked as OP4.

OP5: The next unused block of random source (05) is used to determine the amount of input data (03) that is to be processed and is shown as OP5.

OP6&OP7: The number blocks to be processed from input source (03) determined from OP5 are transformed, this is represented in OP6 & OP7.

OP8: The swapping between the sources, input source (03) and random source (05), is denoted with a transform marked as OP8.

OP9: The next unused block of random source (05) is used to determine the amount of random data (03) that is to be processed and is shown as OP9.

OP10&OP11: The number blocks to be processed from random source (05) determined from OP9 are transformed, this is represented in OP610 & OP11.

OP12: The swapping between the sources, input source (03) and random source (05), is denoted with a transform marked as OP12.

The processes continue until the input source (03) is fully processed, in such embodiments whereby encryption or processing of the input data is the prime aim. Alternately the process continues until the desired amount of output (06) is created, in such embodiments where the randomisation of transformed data is the desired aim.

OP13: The application of the transform to as baseline (02) to derive the resulting output (06) can be performed either during the steps OP1 through OP12, or be performed as a single phase at the end. The OP13 operation is the decision to apply a NOT to the baseline (02) prior to appending it to the output (06). In this example a suffix marker using NOT has been used.

Figure 18:
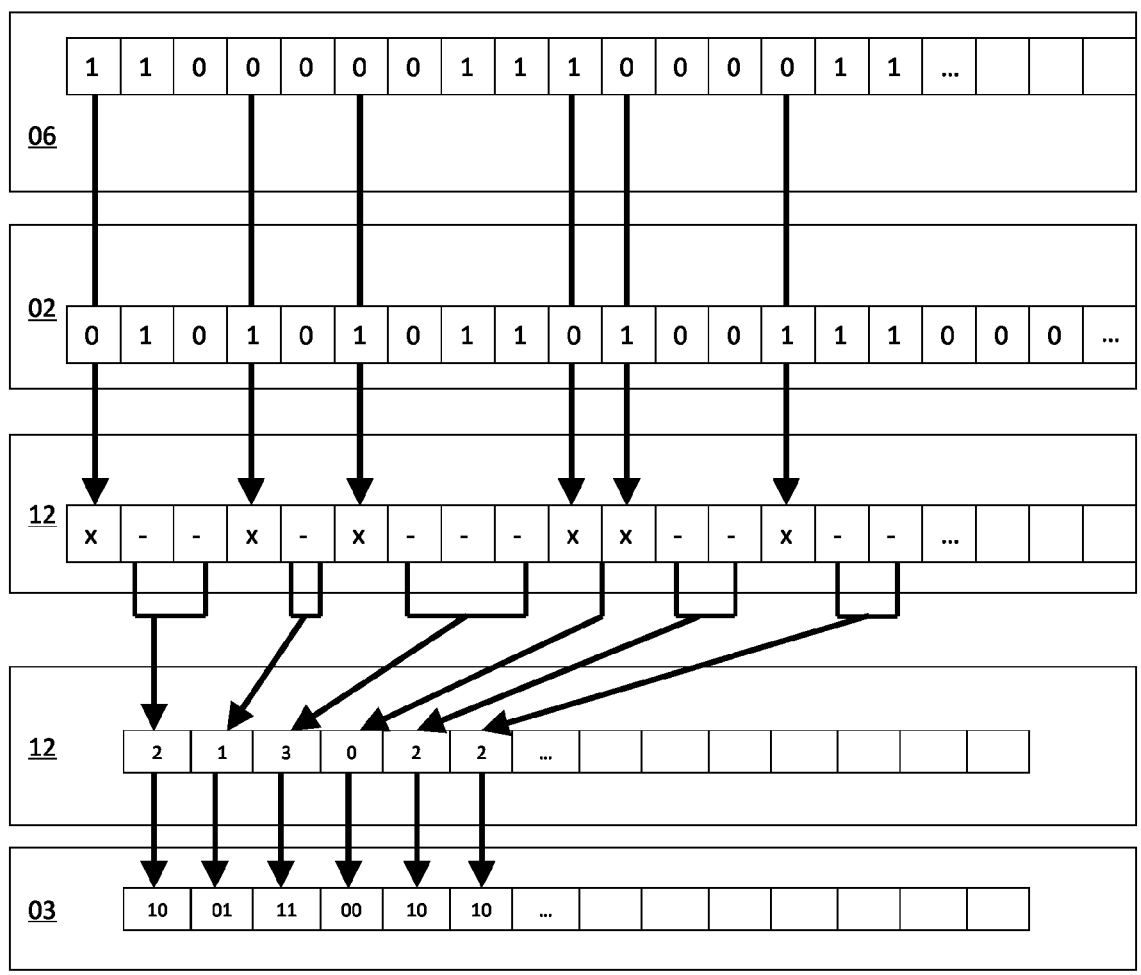
FIG. 18 illustrates an example for the reversal of a Transformation.

FIG. 18—Example for the Reversal of a Transformation.

This shows the principle behind a reversal of a transformation. The example is based on the information outlined in FIG. 5. The example covers the actions needed to identify without error the information transformed together with the baseline. The output from a previous transform (06) is taken and compared with the known baseline (02) used. The resulting differences and non differences are used according to the scheme used in the initial transform to translate these similarities and differences back into their original meaning. Clearly reversing a transformation needs to be so adapted and modified to take into full account the various adaptations, options and equivalent approaches that this invention allows, including but not limited to Prefix or Suffix markers; markers or spaces being represented by the Not operation; Lookup tables and multiple input file support.

Figure 19:
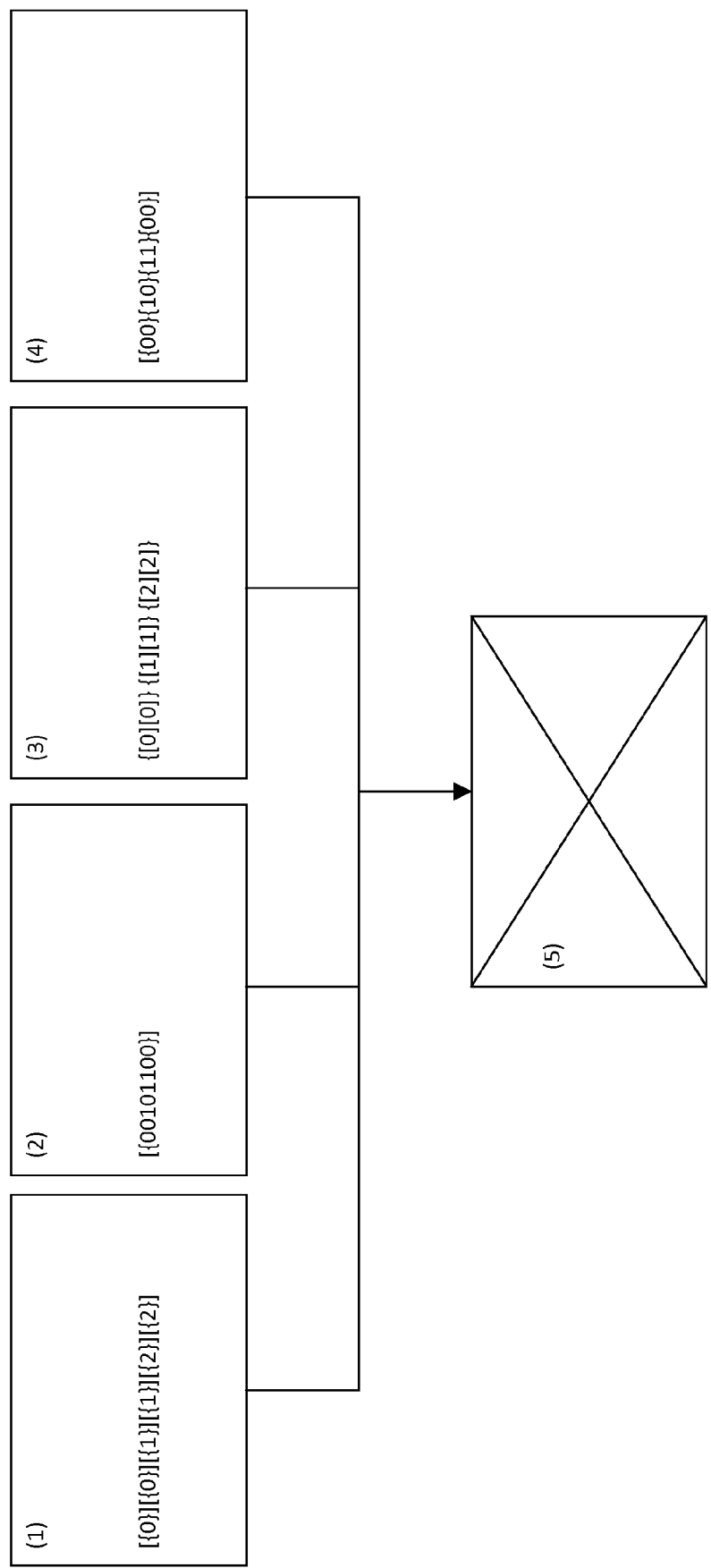
FIG. 19 illustrates possible logical differences in inputs to the transformation from differing sources and the form in which the input data is used.

FIG. 19—Examples of Different Data Inputs

This example shows possible logical differences in inputs to the transformation from differing sources and the form in which the input data is used. The data that is being used comes in logical segmentation: this being represented in the diagram with "[ ]". The logical segmentation that is inherent within the input data however can be overridden by arranging the input data in one or more segments whereby the application and implementation makes flexible and possibly dynamic selection of grouping that can have no relationship in value terms to the implicit structure. Such new segmentation has been marked with "{ }" on the diagram.

Box 5 represents the transformation. Box 1 represents the data having come from a source other than binary, in this case Base 3 and comprises 6 individual numbers. They are passed through to the transformation one after another based upon the implicit form they were received. Box 2 represents the data having come from a binary source, in this example a single byte of 8 bits, which is passed as a value to the transformation as is. Box 3 represents the data having come from a source other than binary, in this case Base 3 and comprises 6 individual numbers. They have been regrouped and segmented into 3 groups of 2 and these three newly derived values have been passed to the transformation. Box 4 represents the data having come from a binary source, in this example a single byte of 8 bits, which is segmented into 4 groups of 2 and these newly derived values have been passed to the transformation.

OVERVIEW OF TECHNICAL APPLICATIONS AND EFFECTS

Encryption

The various alternate derivatives of the invention outlined in the example figures provide several benefits for the applications whereby Encryption is the prime purpose:

1. The diversity of options allows an increase in permutations and therefore the subsequent complexity needed to stop an eavesdropper.

2. The additional ability to integrate and transform multiple files, allows the following examples: one can encrypt either multiple messages or allow the inclusion of random to further protect the integrity of the secret.

Performance Processing

The various alternate derivatives of the invention outlined in the example figures provide several benefits for the applications whereby "performance processing" is the prime purpose:

1. The diversity of options allows an implementation to use various transformations of the invention together, thus providing a faster and more unique identification for processing data comparisons and sorts.

2. The varying options allow a best choice based upon the type and quantity of data.

Random Data Generation

The various alternate derivatives of the invention outlined in the example figures provide several benefits for the applications whereby "random data generation" is the prime purpose:

1. The diversity of options allows an implementation to use various transformations of the invention, these can be nested and create a level of complexity that is irreversible and yet reproducible: In other words the forwards process is fast, simple and cheap, the inverse however is infinite, impossibly complex and very costly. (Nesting means the output of one transform being used as an input for a further transform)

2. The ability to take a small source of random data and yet derive many different further random sources is made possible by mixing and matching the varying options outlined in this invention.

It is important to note that the use of transformed data as a random source can use the transformed data as if it were normal data, in the traditional current computing approach to data: Random sources would not need to be transformed back, however they can be.

Further Embodiments

Introduction of Implementations, Uses and Applications

As described earlier each of the embodiments has one or more fundamental benefits over existing methods in the field. It will be clear to professionals in the field that such characteristics are indeed fundamental to meeting the requirements of each embodiment.

Additionally while each of the embodiments, implementations and envisaged solutions specifies a reasonably specific method, these methods or approaches are for illustration only and clearly a professional in the field of data structure, management and organisation will see the needs and possibilities for obvious deviation, modification or enhancement when implemented in the real world situations. Important to note is that with the publication of this invention the principle of what is "obviously possible" and concept of a "professional in the field of data" becomes possible for the first time. Currently the concept that data structuring for programs and databases, encryption, random data for testing and system modelling are all seen as independent and specialist fields. This is only a realistic standpoint if the unification of these fields outlined in this patent is blatantly ignored.

Encryption

Firstly, the transformation using multiple sources, whereby one is true random, provides an irreversibility of the process which renders unauthorised decryption meaningless. Combined with the lack of confirmation provided through specifically implemented non-repudiation, integrity or authentication features, this makes brute force attacks meaningless.

Secondly, the inability to determine the key even when provided with the method, plaintext and cipher text makes the results of a transformation quite unique over other encryption systems and thinking today.

Processing

The transformation provides a structure to the data that not only provides a different view but a simpler basis on which comparisons can be made. By reducing the comparisons to only those possible the resulting benefit ensured.

Randomization

The transformation provides such a process as to make reversal impossible. The overlaying information using a nested form of the transformation makes the distinction between one source and another impossible so see, calculate or even hint at. While the process appears simple to program, the inverse is impossible.

Further Embodiments

Details of Implementations, Uses and Applications

For the purpose of explanation most examples refer to a file and a computer, but these could be replaced by memory, a standard data field etc or mobile phone, or other programmable environment respectively.

Encryption Key Exchange

Current methods for the establishing of mutual keys between parties are difficult as the process of creating a closed group secret is attempted in a public forum. This is especially a problem with internet use. To create such a close secret requires the impossibility that an eavesdropper to the communications can also participate in entire process needed to create the secret. This actually proves impossible to block as the information available to the parties is also available to the effective eavesdropper. The only ability to stop this same level of knowledge existing is to ensure that something is shared through a form inaccessible to the eavesdropper, thus rendering the knowledge incomplete and therefore useless.

The key exchange implementation envisages an open platform that allows a user to deposit a key with an identifiable label. Each label can be used to request the contents with that label but only once. In establishing this principle, a simple and fast number of label gets and puts creates a large amount of "private" communications that because they can only occur once, none can be repeated by the eavesdropper, thus rendering the ability to know the process to create the secret.

Anti-Virus Protection

Computers execute programs based upon a set of instructions, each instruction being represented by a code or sequence of data. The reason viruses do not work across different operating systems and different processors is that the format and expectations of the programs are different. In effect with each combination of different processors and operating systems the requirements are unique and as such a program designed for one environment cannot operate on another.

The Anti Virus implementation envisages an embedded (set of) key(s) which allow the user to set the key(s) to be used to decrypt programs prior to execution. This causes Virus programs an impossible hurdle, which must encrypt themselves with the correct key; the problem for a Virus program is that it is unable to determine the key by using the difference between known programs within the operating system and the encrypted file on the machine. Additionally users are able to allow execution of a program "once only" and a virus is unable to damage other programs, meaningfully replicate itself or hide because all other programs are encrypted.

In addition, it is a simple task to copy all encrypted programs with their location on disk to a backup DVD, and upon any damage, fast and simple process comparison as described above determines a change and the file can be restored.

Digital Rights Management

Computers and other digital processing devices supporting music, film and other media provide the user a mechanism to replay the media and also to intercept and calculate how to recover the media in an unprotected and untraceable form. This has made the industry wince they need to provide a method that allows a user to replay the media but not to disassemble the media to an unprotected form.

The Digital Rights Management implementation envisages an embedded set of keys known only to the manufacturer and unique to the machine. The machine will decrypt something according to a key directly to the device for which the key is intended but will not decrypt for the user. For a purchase of media to take place the user together with the machines identity approaches the seller to purchase media. The seller creates a "sellers key" of their own and passes this to the hardware manufacturer. The manufacturer encrypts this "sellers key" for the machine and returns this to the seller. The seller encrypts the media with their original key and passes the encrypted media together with the encrypted sellers key to the user. Only the user's machine can determine the key to unlock the media and the machine removes the ability for the user to "see" or "record" the media or the embedded key.

Additionally to this devices that play video, music/sound could also have a key which would be encrypted so that only the machine can see the key, this would allow the media to remain encrypted right up to the speakers or the screen.

Software License Management

Computers and other digital processing devices execute programs. These programs use either a physical device, such as a "dongle" to protect the software from unauthorised copying or make use of complicated and hidden collection of data to make a unique identifier of the machine. Both however work on trying to make the execution of a program locked onto one machine. Both methods have often been broken or are costly.

The Software License Management implementation envisages an embedded set of keys known only to the manufacturer and unique to the machine. The machine will decrypt something according to a key directly to executable memory but not to disk or an area where a user can see or copy the code.

In a similar implementation to Digital Rights Management the ability to detect or calculate the key is removed, and in addition the need for a costly "dongle" is avoided.

Data Protection

Protecting files on disk is important. Computers play an ever increasing role in storing information that we used to keep on paper or in our heads. But as computers and other devices connected to the internet the risk of exposure with our private thoughts, information or interests increased.

The data protection implementation envisages the transformation being used with one or more keys to protect data from unauthorised access.

Database Data—Encrypted Processing

Protecting databases is similar to protecting files; however an extra complication presents itself. With current databases they need to be accessed and used as a whole. This makes "unlocking" needed to process the data and that removes the security. This is especially a problem with mobile databases, such as for doctors, police or such like. In this instance the information is especially valuable or sensitive and yet is needed for the job to be performed. Indeed the index key structures can't be searched unless they are "in plain" as the search order would be affected by the encryption. The indexes are however often the information that is most sensitive.

The Database Data implementation envisages an encrypted database whereby the transformation allows the searches to be performed on encrypted data. This means that the data only need be decrypted if the actual record needs to be seen. What does not need to happen is that all records are decrypted to allow the finding of the record that is needed.

The implementation envisages that the key portions of the records are encrypted using this transformation. The result is a meaningless result in data form; however the sum of the length is still visible. This allows a search based upon the same length to be performed and as such removes all records which could not be valid. If this technique is used on several key pieces of information the reduction is so extreme as to return only the valid record, by removing all the rest. An example is a police database holding "Name", "Address", "ID Card No", "Telephone No", etc., Asking a person on the street for their information will produce a set of lengths that, if sufficient in number, identifies their encrypted record on disk. Yet the machine falling into the hands of a criminal provides nothing. Even a police officer can't be blackmailed or coerced into revealing a key he does not have. This of course has military benefits in that, with a minor change in the logic, messages passed can be interpreted, but an enemy capturing the machine cannot know what to say to create false messages.

Secure Email

Emails are used for private, business communications and commerce. The importance of privacy can be critical for customers as well as for suppliers. This causes no end of risk as the current encryption makes it easier to break the more information that is sent.

The Secure Email implementation envisages a system whereby the key used is created by mixing input from several sources, including one or more from each party. In such an implementation the key or keys would be exchanged by both parties using traditional means and would then be used for the encryption of electronic communications between both parties. Such a system would not only ensure secure communications but would also inherently ensure non-repudiation and integrity.

Anti Spam (Authenticated Communication)

Spam email has plagued the internet virtually since the beginning. The problem has been tackled based upon the premise that one needs to identify what is spam. This approach has failed. The spammers have learnt what others use to detect their email as spam and have made such changes as to not get blocked. The actual approach that resolves the problem is twofold. First the email address that we have never changes without causing the user great problems, second the definition of spam contains "unsolicited". Therefore the reversal of the logic is called for.

The Anti-Spam implementation envisages that the email address remains the same and yet at an application or programming level it does not. The email address alone is constructed to be not enough to communicate with someone. This implementation envisages an "open password". This has two advantages, firstly the email address lists have no commercial value without the currently valid "open password", second the email "open password" can be changed without having to telling existing users. The "open password" is placed in public; with this an email from an unknown party will be decrypted with this "open password". If one receives a spam mail, the user only has to change the "open password". Once a relationship with a person is established and desired a unique password for that user can be agreed. This also means that emails claiming in the address title to be from someone else will not work if the sender does not know the password.

With this approach spam should stop quickly. The spammer intercepting emails from legitimate parties is unable to work out the key with that user and as such has no ability to get into the loop or have access to the email account. A further point to note is that the "cracking" of codes for breaching networks and deception is in most first world countries a serious criminal offence that warrants extradition. This makes the lack of support from less scrupulous governments start to pay a consequence.

Fraud Free Documents and Cards (Credit Cards, Debit Cards, Medical Cards, Passports, Electronic Cash Systems)

The pin number for cash cards and the information and controlled usage of a credit card are flawed. The finance industry looses a lot of money from fraud and the systems we have in place are not sufficient or this fraud would be impossible.

The Information Card implementation envisages an approach where the information needed to confirm a transaction is encrypted. One example is the identity, photograph, full name and signature are only visible if they have been unlocked with a key. This means that a card being found or having been stolen can be duplicated, but without the key or keys allows no one to prepare the way they look or the way they sign to attempt fraud. Indeed using this system a method of encrypted authentication is also possible. A transaction in the form of Buyer, Seller, Amount can be encrypted using a key known only to the card provider that combined with the user key satisfies a legal transaction. This makes the copying of a card more difficult and never the less meaningless without being in possession of the user's key.

Digital Network Communications (WLAN, Ethernet & Other Networks, Mobile Phone, Cordless Phone, Subscription TV & Radio, Internet Access) & Remote Control, Command and Control Systems (Devices, Machines, Vehicles, Weapons Systems, Remote Computer Management)

Controlling devices and machines whereby the instructions and or confirmation is sent and received in an open and "visible" form pose a very unique problem. This is never more so than in the case of weapons or other circumstance where the "remote control" being taking over renders the purpose void or lives are cost.

The command and control function being implemented with this invention envisages an encrypted channel using as many of the full secrecy and protection mechanisms and derivatives outlined in this patent to definitely render external interference severely limited, and at best impossible.

Rebroadcast Systems (Repeater Stations, Battle Field Radio Networks, Wireless Networks, Network Proxies, IFF (Identify Friend or Foe))

Information networks work by passing information from node to node, the sender and receiver patch into the nearest node or nodes and messages are carried through various nodes until it reaches its destination. There are occasions where the sender identity and the final destination are themselves a secret. Examples include a radio network on a battlefield, a proxy system for the internet or the routing and transfer of an email. Current systems openly declare the sender and receiver and this can reveal just as much as the contents of the communication.

The Broadcast implementation is envisaged with a nested process of transforms. Each node on the system is defined prior to the message and the passing to the next is defined through an encrypted transform on that step in the system. Such nesting or multiple transforms allows the data to be intercepted at all points in the process without any compromise to the information: neither sender/receiver nor content is discernible.

Data Record Processing—Fast Compare

Searching and comparing data in computers and digital processing devices is programmed to compare exactly. That means that a program will check byte by byte between two fields to confirm that the data is the same, when they are different it moves on to the next comparison until it has finished the job.

The Data Processing implementation envisaged with this invention uses the resulting length of transformed data as a signature of the data. This signature length is then used for a fast comparison to determine if the data could be a match. This means that processing is performed to reduce the full possibilities to only those that are possible. This reduces the amount of work needed for a byte by byte comparison needed to finalise the job.

It is clear to a professional that once a transform has been applied, the resulting length from the transform can be stored and that will represent a far smaller base for a byte by byte comparison to reduce the list. This means that a database will store not only the original field in standard memory structure, but also the comparison value as a length.

Large Data Comparisons

Data Processing occasionally has to deal with large amounts of information that are only valid when retained as a whole. One example is DNA. Large strands of DNA are stored as strings of data, and often usage focuses upon comparisons and differences.

In the Large Data Object Comparisons implementation it is envisaged that the data is a combination of transformed data combined and optionally merged with traditional data. This hybrid file provides an ability to see change by jumping into the middle of the two files or data sources and comparing a few bytes at an offset within the file. If they are different, one can choose a smaller offset and compare. This process in an iterative form allows the location of a change or difference to be found more quickly than a sequentially processed byte by byte comparison. The reason optionally traditional data may be included is to allow the traditionally formatted data to be stored neighbouring the transformed version, or can allow a counter to be included. An included counter allows the position in a copy of the data in traditional format to be found without having to reverse the transformation to identify the required actually position for further traditional processing.

Artificial Intelligence

Artificial Intelligence is artificial because the attempt to implement intelligence in a computing environment is missing a fundamental range of abilities that real intelligence has. A brain has the ability to misunderstand context, assume and see similarity. These concepts are very difficult to implement in a computer as a computing device works on absolutes. Is the same; is not the same are operations that can be easily programmed Could be similar; might be different are interpretations that no programming language we know has implemented. The best that can be achieved is a data specific simulation of such behaviour. This simulation however can be learnt and must be defined and fine tuned by a human.

The AI implementation envisages data being transformed. The transformed data then provides a basis on which comparisons can be made whereby only the transformed data length is used and further checks are not performed. This provides a more similar approach to the possibility to make incorrect assumptions, incorrect context or misunderstandings. This brings such systems or implementations far closer to the reality of "intelligent" beings, with all their failings, but equally with their higher performance.

Electronic Voting and Similar

Electronic Voting may be possible with existing systems in that they can allow only one vote per legitimate person or share (in the case of company votes) but there is another requirement for this application. It must be impossible to determine the key of a user thus ensuring that by the next vote an entry in their name cannot be issued. This is difficult with existing systems as a vote is rarely 50:50 in outcome and therefore the assumption can be made based upon the outcome as to the vote a person made. Equally social conditions and character of a person that is publicly known also allow a basis of educated assumption which can be used to confirm the choice made by the person and ultimately the key they have used.

The Electronic Voting implementation envisages the data representing the vote being transformed in a fully encrypted form, by making use of all appropriate optional adaptations available in this invention. As previously described such encrypted data allows no knowledge of the key even when the encrypted data is compared with the known plain text data. In the area of electronic voting such plain text information can be considered to all intents and purposes fully known and virtually guaranteed.

Audit Trails, Government Logs and Legal Evidence and Such Like

Audit trails and locked recording of transactions have similar requirements to those of electronic voting. The additional problem for Audit Trails is that the input information is definitely known by the user whom is being controlled. In most reasonably priced systems the ability to write data is often accompanied with the ability to read data. With an existing system, a user knowing what has been added and combined with what has been created in the encryption process provides a security risk.

The Audit Trail implementation envisages the data being added to the audit log having been transformed in a fully encrypted form, by making use of all appropriate optional adaptations available in this invention. This allows the user no method of determining the key being used even though the before and after data are available to the user being controlled. This allows no chance for the user to change data after the event or add transactions that have not taken place. The implementation would need similar encryption keys embedded on a device in such a form as only the input can be provided and the output is returned. This output is then appended to the end of the data making the audit log. Such keys would need to be defined once but never viewable. The person or organisation applying or defining the key would need to record this elsewhere for checking and control. In the case of financial systems this could be the auditors on behalf of the shareholders in military systems it could be security and in the case of evidence it could be the court.

Encryption Key Generation, Statistical Data, Testing Data and Such Like

As described in the background existing encryption systems fall into two basic methods: complex algorithms or a once used truly random key. In both cases the reliance and investment placed upon existing systems makes a transition to this invention psychologically troublesome, regardless of its' benefits, simple implementation and ease of use.

The random data generation implementation envisages the making use of all appropriate optional adaptations available in this invention to create new data. This new data not only has no resemblance to the original starting point but also has high performance. The resulting data is suitable for statistical analysis, encryption key generation for other encryption systems, testing data for various tasks and all cases where randomised data is required but taking more traditional sources is too expensive, time consuming, complicated or prone to error.

Locks and Secure Access

Current locks and control systems for access control make use of an electronic signature that is sent from one to the other to confirm that the instruction is legitimate. The problem is that the ability to intercept the instruction and resend at another time is not only simple but has been done with relatively small cost and effort.

The lock implementation with this invention envisages a system where by the control and receiving portions share a key. The sender of the instruction prior to sending the instruction requests from the receiver a random code. This code is encrypted with the private key and the instruction is attached. Only when the receiving station receives the code correctly back can the instruction be understood and executed. Recording one transaction between the sending and receiving portions provides only a method of understanding what was able to cause an action. The key remains hidden and the ability to fool the system into thinking that a copy is the legitimate sender is blocked.

Implementations

It will be recognised that the method according to the present invention is suitable and desirable for many applications including, but by no means exclusively, encryption of programs, encryption of data, encryption of transmissions, performance processing of data etc. which could be applied to for instance, data disk protection, anti-virus applications, weapons guidance systems, military communications, wireless telecommunications, wireless networking, banking transactions credit cards, ID cards/Passports/Biometric data, baby phone/CCTV/intercom systems, keys (for car, garage etc., e-mail online banking, internet telephony VoIP, digital rights management, software licensing, statistics, e-voting, health systems, access and doors, imaging and integrity, audit management, safe key backup etc.

A skilled person will recognise that the present invention may be implemented by means of a computer implemented medium which has instructions stored thereupon to perform the method steps of the present invention and could comprise any appropriate medium such as floppy disc, any variety of Compact disc (CD) or DVD, a tape medium, a flash memory stick etc.

The skilled person will also recognise that there exist many examples of a suitable apparatus in which instructions to perform the method of the present invention may be implemented such as any chip or device with the instructions embedded therein e.g. a memory, a mobile telephone, a computer processor, to name but a few.

Such an apparatus adapted to perform the present invention may include a system bus to which is attached processors, memory, e.g., random access memory (RAM), read-only memory (ROM), or other state preserving medium, storage devices, a video interface, and input/output interface ports. The apparatus may be controlled, at least in part, by input from conventional input devices, such as keyboards, mice, etc., as well as by directives received from another apparatuses, interaction with a virtual reality (VR) environment, biometric feedback, or any other input signal.

As used herein, the term "apparatus" is intended to broadly encompass a single device, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The present invention may be implemented by so called retro fitting upon an existing system by means of embeddable functions. The apparatus adapted to perform the present invention may include embedded controllers, such as programmable or non-programmable logic devices or arrays, Application Specific Integrated Circuits, embedded computers, smart cards, and the like. The apparatus may utilize one or more connections to one or more remote machines, such as through a network interface, modem, or other communicative coupling. Apparatuses adapted to perform the present invention may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The present invention may also be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

While the foregoing written description enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiments and methods, but by all embodiments and methods within the scope and spirit of the invention as claimed.

The invention claimed is:

1. A method comprising:
   inputting data in computer-processable form, wherein the input data represents one or more data segments or groups;
   determining one or more values based on respective ones of said segments or groups;
   using said values to determine locations where a predetermined transformation is to be applied to a sequence of bits;
   performing said predetermined transformation on said sequence of bits at each of said locations;
   outputting the sequence of bits as first output data.

2. A method according to claim 1, wherein said input data is in binary form.

3. A method according to claim 1, further comprising arranging said input data in said one or more data segments or groups.

4. A method according to claim 1, wherein said predetermined transformation comprises a sequence of individual predetermined transformations, further comprising:
   performing a counting operation on each of said values;
   wherein said counting operation comprises either counting down from said values or up to said value; and
   wherein on each count, a step of determining whether to apply an individual transformation to a respective bit of the sequence of bits.

5. A method according to claim 1, wherein the values are obtained from at least one look up table.

6. A method according to claim 1, further comprising switching between a plurality of look up tables to obtain said values.

7. A method according to claim 1, wherein the inputted data originates from a plurality of different data sources as data input.

8. A method according to claim 7, further comprising switching between said different data sources as data input.

9. A method according to claim 8, further comprising selecting a portion of data from each data source as data input.

10. A method according to claim 1, further comprising determining a first portion of input data upon which the method is performed and determining a second portion of input data upon which the method is not performed prior to being output.

11. A method according to claim 3 further comprising varying the length of the segments or groups in which the input data is arranged.

12. A method according to claim 5, wherein the look up table includes information indicative of which of the following steps are to be performed:
   switching between a plurality of different data sources;

determining the amount of data from each data source which is to be inputted;

determining a portion of input data upon which the method according to any of the preceding claims is performed and determining a portion of input data upon which the method is not performed prior to being output;

switching between a plurality of look up tables; and varying the length of the segment divided from the input data.

13. A method according to claim 1, wherein the sequence of bits is predetermined, the method comprising:

comparing at least two sets of input data which both have been transformed using the predetermined sequence of bits; and determining the correlation between the at least two sets of input data, and particularly if the at least two sets of input data are identical.

14. A method according to claim 7, wherein at least one of the plurality of data sources comprises the output transformed bits.

15. A method according to claim 1, wherein at least one of a plurality of data sources is arranged to control at least one of the steps of:

switching between a plurality of different data sources;

determining the amount of data from each data source which is to be inputted;

determining a portion of input data upon which the method according to any of the preceding claims is performed and determining a portion of input data upon which the method is not performed prior to being output;

switching between a plurality of look up tables; and varying the length of the segment divided from the input data.

16. A method according to claim 1, further comprising processing the first output data, the processing step further comprising:

inputting a first sequence of binary data;

comparing the data with a second sequence of bits;

determining locations where a predetermined transformation has been applied to the first sequence;

deriving a respective value for each instance of said predetermined transformation;

determining a respective sequence of bits for each of said values;

concatenating the respective sequences of bits;

outputting the concatenated sequences of bits as second output data.

17. A method according to claim 16 comprising, in the first sequence of bits, performing a counting operation on a number of bits between instances of said predetermined transformation and deriving a respective value on the basis of said count; wherein said predetermined transformation comprises a sequence of individual predetermined transformations.

18. A method according to claim 16, wherein the step of determining a sequence of bits for each of said values involves looking up the values in at least one look up table.

19. A method according to claim 16 for processing first output data, determining a first portion of input data upon which the method is performed and determining a second portion of input data upon which the method is not performed prior to being output; and further comprising:

performing the steps of claim 16 on said first portion of the input data only.

20. A method according to claim 16, wherein the concatenated output data is output to different locations depending on the respective data source it originates from.

21. A method according to claim 16, wherein said first sequence of binary data corresponds to said first output data.

22. A data processing system including a computing device, the system arranged to perform the method of claim 1.

23. A computer program product comprising a non-transitory computer readable medium having machine-readable code stored thereupon which, when executed by a data processing system, executes the method of claim 1.

* * * * *